(12) United States Patent
Ohno et al.

(10) Patent No.: US 7,785,695 B2
(45) Date of Patent: *Aug. 31, 2010

(54) HONEYCOMB STRUCTURED BODY

(75) Inventors: Kazushige Ohno, Gifu (JP); Atsushi Kudo, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 1150 days.

This patent is subject to a terminal disclaimer.

(21) Appl. No.: 11/341,507

(22) Filed: Jan. 30, 2006

(65) Prior Publication Data

US 2006/0194018 A1 Aug. 31, 2006

(51) Int. Cl.
*B32B 3/12* (2006.01)
*B01D 50/00* (2006.01)
*B01D 53/34* (2006.01)
*B01D 59/50* (2006.01)
*B01D 39/20* (2006.01)

(52) U.S. Cl. ............... 428/116; 428/117; 428/118; 422/180; 55/482; 55/484; 55/523

(58) Field of Classification Search ............ None
See application file for complete search history.

(56) References Cited

U.S. PATENT DOCUMENTS

| 4,276,071 A | 6/1981 | Outland |
| 4,364,761 A | 12/1982 | Berg et al. |
| 4,416,676 A * | 11/1983 | Montierth ............ 55/523 |
| 4,417,908 A | 11/1983 | Pitcher, Jr. |
| 4,420,316 A | 12/1983 | Frost et al. |
| 4,643,749 A | 2/1987 | Miura |
| 4,857,089 A | 8/1989 | Kitagawa et al. |
| 5,545,243 A | 8/1996 | Kotani et al. |
| 5,914,187 A | 6/1999 | Naruse et al. |
| 5,930,994 A | 8/1999 | Shimato et al. |

(Continued)

FOREIGN PATENT DOCUMENTS

DE 10037403 2/2002

(Continued)

OTHER PUBLICATIONS

European Patent Office, "Communication of Notices of Opposition (R.79(1) EPC)," dated Dec. 30, 2008 (21 pgs.).

(Continued)

*Primary Examiner*—Gordon R Baldwin
(74) *Attorney, Agent, or Firm*—Finnegan, Henderson, Farabow, Garrett & Dunner, L.L.P.

(57) ABSTRACT

A pillar-shaped honeycomb structured body comprises large-capacity through holes and small-capacity through holes, a first partition wall between two adjacent large-capacity through holes, a second partition wall between a large-capacity through holes and a small-capacity through holes adjacent to each other. Each of the plurality of large-capacity through holes and small-capacity through holes extends from a first end face to a second end face. An aperture rate $\alpha$ (%) is a ratio between the sum of the area of the large-capacity through holes at the second end face and the area of the second end face. The difference in the thickness of the first partition wall and the second partition wall is $\beta$ (mm). The relationship between $\alpha$ and $\beta$ satisfies the following inequalities (1) and (2): $0.0022\alpha+0.0329 \leq \beta \leq 0.0071\alpha+0.2553$ (1), and about $35 \leq \alpha \leq$ about 60 (2).

30 Claims, 10 Drawing Sheets

U.S. PATENT DOCUMENTS

| | | | | |
|---|---|---|---|---|
| 6,149,877 | A * | 11/2000 | Ogai | 422/180 |
| 6,395,370 | B1 * | 5/2002 | Noda et al. | 428/116 |
| 6,447,564 | B1 | 9/2002 | Ohno et al. | |
| 6,565,630 | B2 | 5/2003 | Ohno et al. | |
| 6,669,751 | B1 | 12/2003 | Ohno et al. | |
| 6,696,132 | B2 | 2/2004 | Beall et al. | |
| 6,716,512 | B2 | 4/2004 | Yamamoto et al. | |
| 6,770,116 | B2 | 8/2004 | Kojima | |
| 6,939,825 | B1 | 9/2005 | Ohno et al. | |
| 7,250,385 | B1 | 7/2007 | Ohno et al. | |
| 7,326,270 | B2 * | 2/2008 | Hong et al. | 55/523 |
| 2002/0045541 | A1 | 4/2002 | Koike et al. | |
| 2002/0180117 | A1 | 12/2002 | Yamamoto et al. | |
| 2003/0041730 | A1 | 3/2003 | Beall et al. | |
| 2003/0108154 | A1 | 6/2003 | Schmitt | |
| 2003/0167755 | A1 | 9/2003 | Nakatani et al. | |
| 2004/0031264 | A1 | 2/2004 | Kojima | |
| 2004/0033175 | A1 | 2/2004 | Ohno et al. | |
| 2004/0055265 | A1 | 3/2004 | Ohno et al. | |
| 2004/0097370 | A1 | 5/2004 | Ichikawa et al. | |
| 2004/0161596 | A1 | 8/2004 | Taoka et al. | |
| 2004/0223892 | A1 | 11/2004 | Kojima | |
| 2005/0011174 | A1 | 1/2005 | Hong et al. | |
| 2005/0016140 | A1 | 1/2005 | Komori et al. | |
| 2005/0016141 | A1 | 1/2005 | Hong et al. | |
| 2005/0076626 | A1 | 4/2005 | Kudo et al. | |
| 2005/0076627 | A1 | 4/2005 | Itou et al. | |
| 2005/0102987 | A1 | 5/2005 | Kudo | |
| 2005/0109023 | A1 | 5/2005 | Kudo et al. | |
| 2005/0115224 | A1 | 6/2005 | Kojima | |
| 2005/0153099 | A1 | 7/2005 | Yamada | |
| 2005/0159310 | A1 | 7/2005 | Ohno et al. | |
| 2005/0160710 | A1 | 7/2005 | Taoka et al. | |
| 2005/0161849 | A1 | 7/2005 | Ohno et al. | |
| 2005/0169818 | A1 | 8/2005 | Ohno et al. | |
| 2005/0169819 | A1 | 8/2005 | Shibata | |
| 2005/0175514 | A1 | 8/2005 | Ohno | |
| 2005/0176581 | A1 | 8/2005 | Ohno et al. | |
| 2005/0178098 | A1 | 8/2005 | Ono et al. | |
| 2005/0180898 | A1 | 8/2005 | Yamada | |
| 2005/0214504 | A1 | 9/2005 | Yoshida | |
| 2005/0229565 | A1 | 10/2005 | Yoshida | |
| 2005/0235621 | A1 | 10/2005 | Kunieda et al. | |
| 2005/0247038 | A1 | 11/2005 | Takahashi | |
| 2005/0272602 | A1 | 12/2005 | Ninomiya | |
| 2006/0019061 | A1 | 1/2006 | Oshimi | |
| 2006/0029897 | A1 | 2/2006 | Saijo et al. | |
| 2006/0029898 | A1 | 2/2006 | Saijo et al. | |
| 2006/0032203 | A1 | 2/2006 | Komori et al. | |
| 2006/0043652 | A1 | 3/2006 | Saijo et al. | |
| 2006/0059877 | A1 | 3/2006 | Yoshida | |
| 2006/0068159 | A1 | 3/2006 | Komori et al. | |
| 2006/0073970 | A1 | 4/2006 | Yamada | |
| 2006/0188415 | A1 | 8/2006 | Ohno et al. | |
| 2006/0194018 | A1 | 8/2006 | Ohno et al. | |
| 2008/0017572 | A1 | 1/2008 | Kudo | |
| 2008/0241009 | A1 | 10/2008 | Ohno et al. | |
| 2008/0241010 | A1 | 10/2008 | Ohno et al. | |
| 2008/0241011 | A1 | 10/2008 | Ohno et al. | |
| 2008/0241012 | A1 | 10/2008 | Ohno et al. | |
| 2008/0241013 | A1 | 10/2008 | Ohno et al. | |
| 2008/0247918 | A1 | 10/2008 | Ohno et al. | |
| 2008/0260599 | A1 | 10/2008 | Ohno et al. | |

FOREIGN PATENT DOCUMENTS

| | | |
|---|---|---|
| EP | 0 089 751 | 9/1983 |
| EP | 0 277 012 | 8/1988 |
| EP | 0 658 363 | 6/1995 |
| EP | 1 142 619 | 10/2001 |
| EP | 1 142 619 A1 | 10/2001 |
| EP | 1 170 270 | 1/2002 |
| EP | 1 174 399 | 1/2002 |
| EP | 1 338 322 A1 | 8/2003 |
| EP | 1 447 535 | 8/2004 |
| FR | 2 278 9327 | 9/1999 |
| FR | 2789327 | 8/2000 |
| FR | 2 840 545 | 12/2003 |
| GB | 2 064 360 | 6/1981 |
| JP | 56-124417 | 9/1981 |
| JP | 56-124418 | 9/1981 |
| JP | 58-92409 | 6/1983 |
| JP | 58-150015 | 9/1983 |
| JP | 58-196820 | 11/1983 |
| JP | 61-424 | 1/1986 |
| JP | 62-96717 | 5/1987 |
| JP | 63-185425 | 8/1988 |
| JP | 3-49608 | 7/1991 |
| JP | 3-102016 | 10/1991 |
| JP | 5-68828 | 3/1993 |
| JP | 6-47620 | 6/1994 |
| JP | 7-163823 | 6/1995 |
| JP | 08-299809 | 11/1996 |
| JP | 10-263416 | 10/1998 |
| JP | 3130587 | 11/2000 |
| JP | 2001-96117 | 4/2001 |
| JP | 2001-162121 | 6/2001 |
| JP | 2001-199777 | 7/2001 |
| JP | 2001-206780 | 7/2001 |
| JP | 2001-246250 | 9/2001 |
| JP | 2001-334114 | 12/2001 |
| JP | 2002-177793 | 6/2002 |
| JP | 2003-1029 | 1/2003 |
| JP | 2003-49627 | 2/2003 |
| JP | 2003-155908 | 5/2003 |
| JP | 2004-896 | 1/2004 |
| WO | WO 01/23069 | 4/2001 |
| WO | WO 01/53232 | 7/2001 |
| WO | WO 02/10562 | 2/2002 |
| WO | WO 02/096827 | 12/2002 |
| WO | WO 02/100514 | 12/2002 |
| WO | WO 03/014539 | 2/2003 |
| WO | WO 03/020407 | 3/2003 |
| WO | WO 03/044338 | 5/2003 |
| WO | WO 03/080218 | 10/2003 |

OTHER PUBLICATIONS

Yamada, "Honeycomb Structured Body", U.S. Appl. No. 11/225,197, filed Sep. 14, 2005.
Yoshida, "Honeycomb Structured Body", U.S. Appl. No. 11/368,401, filed Mar. 7, 2006.
Ohno et al., "Honeycomb Structured Body", U.S. Appl. No. 11/340,591, filed Jan. 27, 2006.
PCT International Preliminary Report on Patentability.
English language translation of a Chinese Patent Office Action for Chinese Patent Application No. 200610006791.4.

* cited by examiner

A-A Line cross-sectional view 201a
201b 211a
211b 221a
221b 231b
231a

HONEYCOMB STRUCTURED BODY

CROSS-REFERENCE TO RELATED APPLICATIONS

This application claims benefit of priority based on PCT/JP2004/015505 filed on Oct. 20, 2004. The contents of this application are incorporated herein by reference in their entirety.

BACKGROUND OF THE INVENTION

1. Field of the Invention

The present invention relates to a honeycomb structured body.

2. Discussion of the Background

In recent years, particulates such as soot and the like contained in exhaust gases discharged from internal combustion engines of vehicles, such as buses and trucks, and construction machines, have raised serious problems as those particulates are harmful to the environment and the human body.

There have been proposed various honeycomb structured bodies made from porous ceramics, which serve as filters capable of collecting particulates in exhaust gases to purify the exhaust gases.

Conventionally, with respect to the honeycomb structured body of this type, a filter having the following structure has been proposed: two kinds of through holes, that is, a group of through holes with a relatively large capacity (hereinafter, referred to as large-capacity through hole) and a group of through holes with a relatively small capacity (hereinafter, referred to as small-capacity through hole), are prepared, and each of the large-capacity through holes is sealed with a plug at one end, and each of the small-capacity through holes is sealed with a plug at the other end. With respect to the honeycomb structured body of this type, there has been proposed a technique in which the opening side of the large-capacity through holes is used as the inlet-side of a filter with the opening side of the small-capacity through holes being used as the outlet-side of the filter (for example, see JP-A 56-124418, JP-A 56-124417, JP-A 62-96717, J UM-A 58-92409, U.S. Pat. No. 4,416,676, JP-A 58-196820, U.S. Pat. No. 4,420,316, JP-A 58-150015, JP-A 5-68828, French Patent No. 2789327, International Publication No. WO02/100514, International Publication No. WO02/10562, and International Publication No. WO03/20407).

Moreover, there have been known honeycomb structured bodies (such as filters) having a structure in which the number of through holes that have openings on the inlet-side (hereinafter, referred to as inlet-side through holes) is made greater than the number of through holes that have openings on the outlet-side (hereinafter, referred to as outlet-side through holes), and the like (for example, see FIG. 3 of JP-A 58-196820).

In the honeycomb structured bodies of this type, the through holes are constituted by two types of through holes, that is, a group of large-capacity through holes (having a relatively great total amount of surface areas and cross-sectional areas) and a group of small-capacity through holes (having a relatively small total amount of surface areas and cross-sectional areas).

Recently, in the case where the honeycomb structured body is used in an exhaust gas purifying device as a filter, processes to carry out oxidizing and removing of particulates, together with processes to carry out purifying (converting) of toxic gas components in exhaust gases through oxidation and reduction are adopted, by allowing the honeycomb structured body to support a catalyst.

The contents of JP-A 56-124418, JP-A 56-124417, JP-A 62-96717, J UM-A 58-92409, U.S. Pat. No. 4,416,676, JP-A 58-196820, U.S. Pat. No. 4,420,316, JP-A 58-150015, JP-A 5-68828, French Patent No. 2789327, International Publication No. WO02/100514, International Publication No. WO02/10562, and International Publication No. WO03/20407 are incorporated herein by reference in their entirety.

SUMMARY OF THE INVENTION

In accordance with a first aspect of the present invention, provided is a pillar-shaped honeycomb structured body comprising a large number of through holes that are longitudinally placed in parallel with one another with a partition wall therebetween, wherein the large number of through holes include a group of large-capacity through holes being sealed at one side of an end portion of the honeycomb structured body, so that the sum of areas on a cross section perpendicular to the longitudinal direction is made relatively larger, and a group of small-capacity through holes being sealed at the other side of the end portion of the honeycomb structured body, so that the sum of areas on the cross section is made relatively smaller, and when an aperture rate which is a ratio at which the area of the group of large-capacity through holes accounts for the total area of the end face on the inlet-side of the honeycomb structured body is represented by $\alpha$ (%), and a difference in thickness on the cross section between: the portion of said partition wall that separates adjacently located through holes constituting the group of large-capacity through holes from each other; and the portion of said partition wall that separates adjacently located through holes, one of which constituting the group of large-capacity through holes and the other of which constituting the group of small-capacity through holes (hereinafter, also referred to as the difference in thickness between respective portions of partition walls), is represented by $\beta$ (mm), relationships indicated by the following inequalities (1) and (2) are satisfied:

$$0.0022\alpha + 0.0329 \leq \beta \leq 0.0071\alpha + 0.2553 \quad (1), \text{ and}$$

$$\text{about } 35 \leq \alpha \leq \text{about } 60 \quad (2).$$

In the present specification, the total area of the end face on the inlet-side refers to the total sum of areas of portions constituted by through holes and the portion of the partition wall, and it is defined that the portions occupied by sealing material layers are not included in the total area of the end faces.

The combination between the above-mentioned group of large-capacity through holes and group of small-capacity through holes includes: (1) a case where, with respect to each of through holes constituting the large-capacity through holes and each of through holes constituting the small-capacity through holes, the areas of cross sections perpendicular to the longitudinal direction are the same, while the number of the through holes constituting the group of large-capacity through holes is greater; (2) a case where, with respect to each of through holes constituting the large-capacity through holes and each of through holes constituting the small-capacity through holes, the areas of cross sections thereof are different from each other, with the numbers of the respective through holes being different from each other; and (3) a case where, with respect to each of through holes constituting the large-capacity through holes and each of through holes constituting the small-capacity through holes, the area of the cross section of the through holes constituting the group of large-capacity through holes is greater, with the numbers of the through holes of the two groups being the same.

Moreover, with respect to the through holes constituting the group of large-capacity through holes and/or the group of small-capacity through holes, those through holes may be respectively formed by using through holes of one type having the same shape, the same area and the like of cross sections perpendicular to the longitudinal direction, or may be respectively formed by using through holes of two or more types having different shapes and different areas of cross sections perpendicular to the longitudinal direction.

Moreover, in the honeycomb structured body of the present invention, shapes as basic units are repeated, and from the viewpoint of the basic units, the area ratios in the cross section are different from each other. However, in the vicinity of circumferential portion, there are basic units lacking its portions, and with respect to these basic units, the above-mentioned rule is not applicable. Therefore, so as to be counted as a honeycomb structured body of the present invention, when measurements are strictly carried out for up to one or two cells on the circumference, the calculations need to be carried out by excluding those one or two cells, or to be carried out for portions excluding the basic units without repetitions. More specifically, for example, as shown in FIG. 11, a honeycomb structured body having a structure in which, in the case where the shape of all the through holes in a cross section perpendicular to the longitudinal direction are the same except for those in the vicinity of the circumference, and with respect to the through holes having the same shape in the cross section, when either end thereof is plugged while plugged portions and opened portions of each of the ends are placed in a manner so as to form a checked pattern as a whole, is determined not to be included in the honeycomb structured body of the present invention.

In the honeycomb structured body in accordance with the first aspect of the present invention, desirably, a relationship indicated by the following inequality (3) is further satisfied:

$$0.0046\alpha+0.0077 \leq \beta \leq 0.0071\alpha+0.1553 \quad (3).$$

In the honeycomb structured body in accordance with the first aspect of the present invention, desirably, the portion of the partition wall that separates adjacently located through holes constituting the group of large-capacity through holes from each other has a thickness of about 0.2 to about 1.2 mm, and the portion of the partition wall that separates adjacently located through holes, one of which constituting the group of large-capacity through holes and the other of which constituting the group of small-capacity through holes, has a thickness of about 0.2 to about 1.2 mm.

Further, in the honeycomb structured body in accordance with the first aspect of the present invention, the aperture rate $\alpha$ on the inlet-side is desirably about 35% to about 60%, and more desirably about 40% to about 55%.

In the honeycomb structured body in accordance with the first aspect of the present invention, desirably, a catalyst is supported on the portion of the partition wall that separates adjacent through holes constituting the group of large-capacity through holes.

The catalyst comprises desirably at least one selected from the group consisting of noble metal, alkali metal, alkali earth metal, rare-earth element and transition metal element. The noble metal comprises desirably at least one selected from the group consisting of platinum, palladium and rhodium.

Further, desirably, the catalyst is supported on a surface of the partition wall inside the through hole constituting the group of large-capacity through holes and/or on a surface of a pore in the vicinity of the surface of the partition wall.

It is desirable that the catalyst is further supported on the portion of the partition wall that separates adjacently located through holes, one of which constituting the group of large-capacity through holes and the other of which constituting the group of small-capacity through holes, and that the ratio of the concentration of the catalyst supported on the portion of the partition wall that separates adjacently located through holes constituting the group of large-capacity through holes to the concentration of the catalyst supported on the portion of the partition wall that separates adjacently located through holes, one of which constituting the group of large-capacity through holes and the other of which constituting the group of small-capacity through holes, is in the range of about 1.1 to about 3.0.

It is desirable that the honeycomb structured body in accordance with the first aspect of the present invention mainly comprises a porous ceramic material. The material comprises desirably selected from the group consisting of nitride ceramics, carbide ceramics and oxide ceramics.

The porosity of the honeycomb structured body in accordance with the first aspect of the present invention is desirably in the range of about 20% to about 80%. The average pore diameter of the honeycomb structured body is desirably in the range of about 1 μm to about 100 μm.

In the honeycomb structured body in accordance with the first aspect of the present invention, desirably, the through holes that constitute the group of large-capacity through holes and/or the through holes that constitute the group of small-capacity through holes have a cross-sectional shape perpendicular to the longitudinal direction thereof which is a polygonal shape.

In the honeycomb structured body in accordance with the first aspect of the present invention, desirably, the cross-sectional shape perpendicular to the longitudinal direction of the through holes that constitute the group of large-capacity through holes is an octagonal shape, and the cross-sectional shape perpendicular to the longitudinal direction of the through holes that constitute the group of small-capacity through holes is a quadrangular shape.

In the honeycomb structured body in accordance with the first aspect of the present invention, desirably, a ratio of the areas on a cross section perpendicular to the longitudinal direction of the group of large-capacity through holes to the areas on the cross section perpendicular to the longitudinal direction of the group of small-capacity through holes is in the range of about 1.5 to about 2.7.

In the honeycomb structured body in accordance with the first aspect of the present invention, desirably, on the cross section perpendicular to the longitudinal direction, at least one of angles formed by crossing of the portion of the partition wall that separates adjacent through holes constituting the group of large-capacity through holes and the portion of the partition wall that separates adjacent through holes, one of which constituting the group of large-capacity through holes and the other of which constituting the group of small-capacity through holes, is an obtuse angle.

In the honeycomb structured body in accordance with the first aspect of the present invention, desirably, on the cross section perpendicular to the longitudinal direction, the vicinity of each of corners of the through hole constituting the group of the large-capacity through holes and/or the through hole constituting the group of the small-capacity through holes is formed by a curved line.

In the honeycomb structured body in accordance with the first aspect of the present invention, desirably, the distance between centers of gravity on a cross section perpendicular to the longitudinal direction of adjacent through holes constituting the group of the large-capacity through holes is equal to the distance between centers of gravity on a cross-section perpendicular to the longitudinal direction of adjacent through holes constituting the group of the small-capacity through holes.

Further, in the honeycomb structured body in accordance with the first aspect of the present invention, desirably, the number of through holes constituting the group of large-capacity through holes and the number of through holes constituting the group of small-capacity through holes are substantially the same.

In accordance with a second aspect of the present invention, provided is a pillar-shaped honeycomb structured body comprising a large number of through holes that are longitudinally placed in parallel with one another with a partition wall therebetween, wherein the large number of through holes include a group of large-capacity through holes being sealed at one side of an end portion of the honeycomb structured body, so that the sum of areas on a cross section perpendicular to the longitudinal direction is made relatively larger, and a group of small-capacity through holes being sealed at the other side of the end portion of the honeycomb structured body, so that the sum of areas on the cross section is made relatively smaller;

a catalyst is supported on the portion of the partition wall that separates adjacently located through holes of the group of large-capacity through holes from each other, and on a portion of the partition wall that separates adjacently located through holes, one of which constituting the group of large-capacity through holes and the other of which constituting the group of small-capacity through holes; and a ratio of: the concentration of the catalyst supported on a portion of the partition wall that separates the adjacently located through holes constituting the group of large-capacity through holes from each other, to the concentration of the catalyst supported on the portion of the partition wall that separates the adjacently located through holes, one of which constituting the group of large-capacity through holes and the other of which constituting the group of small-capacity through holes, is in the range of about 1.1 to about 3.0.

In the honeycomb structured body in accordance with the second aspect of the present invention, desirably, platinum is used as the catalyst, and a ratio of the concentration of platinum supported on the portions of the partition wall that separate adjacently located through holes constituting the group of large-capacity through holes to the concentration of platinum supported on the portions of the partition wall that separate adjacently located through holes, one of which constituting the group of large-capacity through holes and the other of which constituting the group of small-capacity through holes, is in the range of about 1.1 to about 3.0.

The honeycomb structured body in accordance with the first or the second aspect of the present invention is desirably used for an exhaust gas purifying device in a vehicle.

In accordance with a third aspect of the present invention, provided is a honeycomb structured body comprising:

a honeycomb block formed by combining a plurality of the honeycomb structured bodies according to the first or second aspect of the present invention together through an adhesive layer; and a sealing material layer which is formed on the peripheral face of the honeycomb block.

The adhesive layer desirably comprises a dense material or a porous material. The adhesive layer and the sealing material layer desirably comprise inorganic fibers and/or inorganic particles in addition to an inorganic binder and an organic binder.

The honeycomb structured body in accordance with the third aspect of the present invention is desirably used for an exhaust gas purifying device in a vehicle.

In addition to the case where the honeycomb structured body of the first or second aspect of the present invention are used as constituent members for the honeycomb structured body in accordance with the third aspect of the present invention, only a single honeycomb structured body of the first or second aspect may be used as a filter.

Hereinafter, a honeycomb structured body having a structure as one integral unit as a whole, that is, the honeycomb structured body in accordance with the first or second aspect of the present invention, is referred to also as an integral honeycomb structured body, and a honey comb structured body having a structure in which a plurality of ceramic members are combined with one another through sealing material layers, that is, the honeycomb structured body in accordance with the third aspect of the present invention, is referred to also as an aggregated type honeycomb structured body. In the case where no discrimination is required between the integral honeycomb structured body and the aggregated type honeycomb structured body, the corresponding structured body is referred to as a honeycomb structured body.

DESCRIPTION OF THE EMBODIMENTS

A honeycomb structured body in accordance with the first aspect of the present invention is a pillar-shaped honeycomb structured body comprising a large number of through holes that are longitudinally placed in parallel with one another with a partition wall therebetween, wherein the large number of through holes include a group of large-capacity through holes being sealed at one side of an end portion of the honeycomb structured body, so that the sum of areas on a cross section perpendicular to the longitudinal direction is made relatively larger, and a group of small-capacity through holes being sealed at the other side of the end portion of the honeycomb structured body, so that the sum of areas on the cross section is made relatively smaller, and when an aperture rate which is a ratio at which the area of the group of large-capacity through holes accounts for the total area of the end face on the inlet-side of the honeycomb structured body is represented by α (%), and a difference in thickness on the cross section between: the portion of the partition wall that separates adjacently located through holes constituting the group of large-capacity through holes from each other; and the portion of the partition wall that separates adjacently located through holes, one of which constituting the group of large-capacity through holes and the other of which constituting the group of small-capacity through holes, is represented by β (mm), relationships indicated by the following inequalities (1) and (2) are satisfied:

$$0.0022\alpha+0.0329 \leq \beta \leq 0.0071\alpha+0.2553 \quad (1), \text{ and}$$

$$\text{about } 35 \leq \alpha \leq \text{about } 60 \quad (2).$$

Here, the aperture rate α on the inlet-side refers to a ratio at which the area of the group of large-capacity through holes accounts for the total area of end faces on the inlet-side of the honeycomb structured body as described above.

Figure 1A:
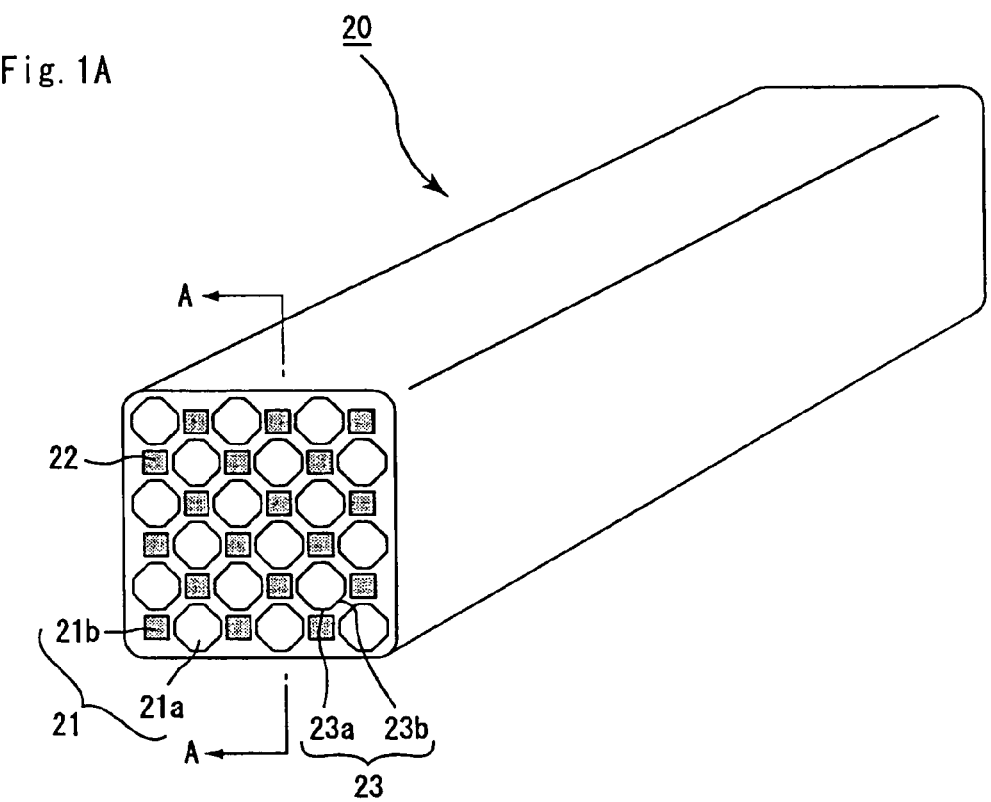
FIG. 1A is a perspective view that schematically shows one example of an integral honeycomb structured body of the present invention.
Figure 1B:
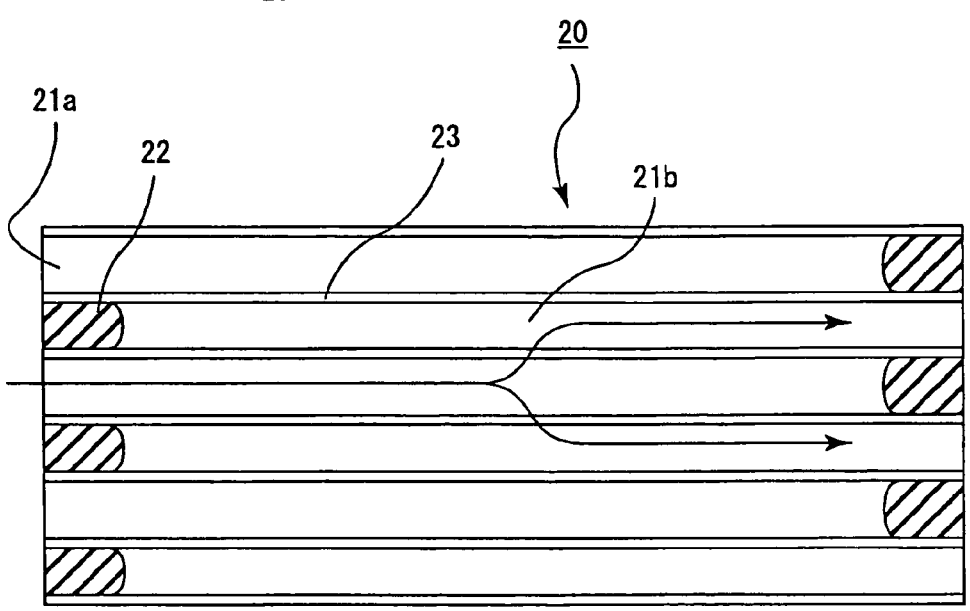
FIG. 1B is a cross-sectional view taken along line A-A of the integral honeycomb structured body of the present invention shown in FIG. 1A.

FIG. 1A is a perspective view that schematically shows one example of an integral honeycomb structured body of the first aspect of the present invention, and FIG. 1B is a cross-sectional view taken along line A-A of the integral honeycomb structured body of the first aspect of the present invention shown in FIG. 1A.

As shown in FIG. 1A, the integral honeycomb structured body 20 having an approximately square pillar shape comprises a number of through holes 21 longitudinally placed in parallel together with a partition wall 23 interposed therebetween. The through holes 21 include two kinds of through holes, that is, large-capacity through holes 21a with ends on the outlet-side of the integral honeycomb structured body 20 sealed with plugs 22 and small-capacity through holes 21b with ends on the inlet-side of the integral honeycomb structured body 20 sealed with plugs 22, and the area on the cross section perpendicular to the longitudinal direction of the large-capacity through holes 21a is made relatively greater in comparison with that of the small-capacity through holes 21b. The portions of the partition wall 23 that separates these through holes 21 from each other is allowed to serve as a filter. In other words, exhaust gases that have entered the large-capacity through holes 21a are allowed to flow out of the small-capacity through holes 21b after always passing through the portion of the partition wall 23.

Here, the combination of the group of large-capacity through holes and the group of small-capacity through holes in the integral honeycomb structured body 20 can be said to be corresponding to a case in which the area of the cross section perpendicular to the longitudinal direction of the through holes 21a constituting the group of large-capacity through holes is greater, with the numbers of the through holes of the two groups being the same, with respect to each of through holes 21a constituting the group of large-capacity through holes and each of through holes 21b constituting the group of small-capacity through holes.

In the integral honeycomb structured body according to the first aspect of the present invention, when an aperture rate which is a ratio at which the area of the group of large-capacity through holes accounts for the total area of the end face on the inlet-side of the honeycomb structured body is represented by α (%), and a difference in thickness on the cross section between: the portion of the partition wall that separates adjacently located through holes constituting the group of large-capacity through holes from each other; and the portion of the partition wall that separates adjacently located through holes, one of which constituting the group of large-capacity through holes and the other of which constituting the group of small-capacity through holes, is represented by β (mm), relationships indicated by the following inequalities (1) and (2) are satisfied:

$$0.0022\alpha+0.0329 \leq \beta \leq 0.0071\alpha+0.2553 \quad (1), \text{ and}$$

$$\text{about } 35 \leq \alpha \leq \text{about } 60 \quad (2).$$

Here, as the aperture rate α on the inlet-side becomes greater, the portion 23a of the partition wall that separates a large-capacity through hole 21a and an adjacent small-capacity through hole 21b becomes thinner. Here, in order to sufficiently convert HC, CO and the like in exhaust gases through a catalyst reaction and sufficiently burn particulates, it is necessary to set the thickness of the portion 23b of the partition wall that separates adjacently located large-capacity through holes 21a from each other to be greater than a certain level, with catalyst being supported thereon. Therefore, in the above-mentioned inequality (1), the difference β in thickness between the respective portions of partition walls is increased in response to an increase of the aperture rate α on the inlet-side.

The lower limit of the difference β in thickness between the respective portions of partition walls is set to 0.0022α+0.0329, and the upper limit thereof is set to 0.0071α+0.2553.

In the case where the difference is between $0.0022\alpha+0.0329$ and $0.0071\alpha+0.2553$, the thickness of the portion 23a of the partition wall that separates a large-capacity through hole 21a and an adjacent small-capacity through hole 21b is large enough to sufficiently support the catalyst and sufficiently burn and remove particulates on the portion 23b of the partition wall. Further, the thickness of the portion 23a of the partition wall that separates a large-capacity through hole 21a and an adjacent small-capacity through hole 21b is small enough for exhaust gases to flow in. Moreover, since the thickness of the portion 23b of the partition wall that separates adjacently located large-capacity through holes 21a from each other is small, the gas permeability of the portion 23b of the partition wall is improved to increase flow-in exhaust gases, encouraging the portion 23b of the partition wall to collect particulates. If the difference β in thickness between the respective portions of partition walls exceeds $0.0071\alpha+0.2553$, the portion 23b of the partition wall may become unnecessarily thicker in comparison with the amount of a catalyst to be supported. The lower limit value of the difference β in thickness between the respective portions of partition walls is desirably set to $0.0046\alpha+0.0077$, and the upper limit value thereof is desirably set to $0.0071\alpha+0.1553$. In other words, the integral honeycomb structured body of the present invention is more desirably designed to satisfy a relationship indicated by the following inequality:

$$0.0046\alpha+0.0077 \leq \beta \leq 0.0071\alpha+0.1553 \quad (3).$$

The thickness of the portion 23b of the partition wall that separates adjacent large-capacity through holes 21a from each other is not particularly limited, and the lower limit thereof is desirably about 0.2 mm, and the upper limit thereof is desirably about 1.2 mm. When the thickness is in the range of about 0.2 mm and about 1.2 mm, a sufficient amount of catalyst can be supported on the portion 23b of the partition wall that separates adjacent large-capacity through holes 21a from each other, and particulates accumulated on the portion 23b of the partition wall can be burned and removed sufficiently. Further, the gas permeability of the portion 23b of the partition wall that separates adjacent large-capacity through holes 21a from each other is improved to avoid a concentration of gas flows on the portion 23a of the partition wall. The cross-sectional flow rate of gases passing through the portion 23a of the partition wall is inhibited from increasing, so that particulates are not allowed to escape, and a partition wall with excellent particulate-collecting capability can be obtained.

The thickness of the portion 23a of the partition wall that separates adjacent large-capacity through hole 21a and small-capacity through hole 21b is not particularly limited, and the lower limit thereof is desirably about 0.2 mm, and the upper limit thereof is desirably about 1.2 mm. When the thickness is in the range of about 0.2 mm and about 1.2 mm, the integral honeycomb structured body 20 has a sufficient strength, and increase of the pressure loss of the integral honeycomb structured body 20 is suppressed.

The lower limit value of the aperture rate α on the inlet-side of the integral honeycomb structured body 20 is set to about 35%, and the upper limit value thereof is set to about 60%. When the aperture rate α on the inlet-side is in the range of about 35% to about 60%, the pressure loss of the integral honeycomb structured body 20 is inhibited from increasing, and the integral honeycomb structured body 20 has a sufficient strength. Since the aperture rate on the outlet-side is large enough, increase of the pressure loss of the integral honeycomb structured body 20 is suppressed. The lower limit value of the aperture rate α on the inlet-side is desirably set to about 40%, and the upper limit value thereof is desirably set to about 55%.

In the integral honeycomb structured body according to the first aspect of the present invention, since the relationship between the aperture rate α on the inlet-side and the difference β in thickness between the respective portions of partition walls is adjusted so as to satisfy a relationship indicated by the above-mentioned inequalities (1) and (2), it becomes possible to sufficiently support a catalyst on the portion 23b of the partition wall that separates adjacently located large-capacity through holes 21a from each other, while reducing an increase in the pressure loss prior to collecting particulates. Therefore, by supporting a catalyst capable of converting toxic gas components in exhaust gases such as CO, HC, NOx and the like on the portion 23b of the partition wall, the integral honeycomb structured body according to the first aspect of the present invention makes it possible to sufficiently convert exhaust gases passing through the portion 23b of the partition wall through a catalyst reaction, and also to utilize reaction heat generated through the catalyst reaction so as to burn and remove the particulates. Moreover, by supporting a catalyst capable of reducing activation energy for burning particulates on the portion 23b of the partition wall, the particulates accumulated on the portion 23b of the partition wall are more easily burned and removed. Consequently, the integral honeycomb structured body according to the first aspect of the present invention makes it possible to improve the particulate purifying performances and consequently to suppress an increase in the pressure loss upon collecting particulates. Moreover, by making the portion 23b of the partition wall that separates adjacently located large-capacity through holes 21a from each other thicker so as to satisfy the relationship indicated by the above-mentioned inequality (1), it becomes possible to improve the strength of the honeycomb structured body. Furthermore, by making the portion 23b of the partition wall that separates adjacently located large-capacity through holes 21a from each other thicker in response to an increase in the aperture rate α on the inlet-side in a manner so as to satisfy the relationship indicated by the above-mentioned inequality (1), it becomes possible to prevent a reduction in the thermal capacity of the honeycomb structured body, and also to suppress occurrence of cracks in the honeycomb structured body due to a thermal shock and the like that occur upon regenerating.

In particular, by adjusting the relationship between the aperture rate α on the inlet-side and the difference β in thickness between the respective portions of partition walls so as to satisfy a relationship indicated by the above-mentioned inequality (3), it becomes possible to sufficiently support a catalyst on the portion 23b of the partition wall that separates adjacently located large-capacity through holes 21a from each other more effectively, while reducing an increase in the pressure loss prior to collecting particulates. Consequently, the integral honeycomb structured body according to the first aspect of the present invention makes it possible to more effectively improve the particulate purifying performances and consequently to suppress an increase in the pressure loss upon collecting particulates.

The integral honeycomb structured body according to the first aspect of the present invention desirably has a catalyst supported on the portion of the partition wall that separates adjacently located through holes constituting the group of large-capacity through holes from each other.

With respect to the catalyst, although not particularly limited, those which can reduce activating energy of burning particulates or can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metal, an element, such as an alkali metal (Group 1 in Element Periodic Table), an alkali earth metal (Group 2 in Element Periodic Table), a rare-earth element (Group 3 in Element Periodic Table) and a transition metal element may be supported thereon.

The above-mentioned catalyst may be supported on the surface of each of pores inside the partition wall 23, or may be supported on the portion of the partition wall 23 with a certain thickness. Moreover, the above-mentioned catalyst may be supported on the surface of the partition wall 23 and/or the surface of each of pores uniformly, or may be supported on a certain fixed place thereof in a biased manner. In particular, the catalyst is desirably supported on the surface, or on the surface of the pore in the vicinity of the surface of the partition wall 23 inside the large-capacity through holes 21a, and it is more desirably supported on both of these surfaces. Thus, the catalyst is easily made in contact with the particulates so that the particulates can be efficiently burned.

In the honeycomb structured body according to the first aspect of the present invention, it is desirable that a catalyst is respectively supported on: the portion of the partition wall that separates adjacently located through holes constituting the group of large-capacity through holes and the portion of the partition wall that separates adjacently located through holes, one of which constituting the group of large-capacity through holes and the other of which constituting the group of small-capacity through holes, and in this arrangement, the ratio of the concentration A of the catalyst supported on the portion of the partition wall that separates adjacently located through holes constituting the group of large-capacity through holes to the concentration B of the catalyst supported on the portion of the partition wall that separates adjacently located through holes, one of which constituting the group of large-capacity through holes and the other of which constituting the group of small-capacity through holes (=A/B; hereinafter, also referred to as the partition wall catalyst concentration ratio) is in the range of about 1.1 to about 3.0. When the ratio is in the range of about 1.1 and about 3.0, the amount of catalyst supported on the portion of the partition wall that separates adjacently located through holes constituting the group of large-capacity through holes from each other is increased, so that purifying performances for particulates can be sufficiently improved. Further, the amount of catalyst supported on the portion of the partition wall that separates adjacently located through holes, one of which constituting the group of large-capacity through holes and the other of which constituting the group of small-capacity through holes, is decreased, so that increase of the pressure loss at the state prior to collecting particulates is suppressed. Moreover, catalyst sintering is inhibited under a high-temperature environment such as during use in an exhaust gas purifying device, suppressing a reduction in the catalyst activity; consequently, the regenerating rate (rate of particulates to be burned and purified) in a filter regenerating process may increase. Incidentally, if the ratio exceeds about 3.0, it is not possible to greatly improve the purifying performances for particulates although the catalyst is supported on the portion of the partition wall that separates adjacently located through holes constituting the group of large-capacity through holes.

Moreover, when applying the catalyst to the integral honeycomb structured body 20, it is desirable to apply the catalyst after the surface thereof is coated with a support member such as alumina. With this arrangement, the specific surface area is made greater so that the degree of dispersion of the catalyst is improved and the reaction sites of the catalyst are increased. Since it is possible to prevent sintering of the catalyst metal by the support member, the heat resistance of the catalyst is also improved. In addition, it becomes possible to reduce the pressure loss.

The integral honeycomb structured body 20 in which the catalyst is supported is allowed to function as a filter capable of collecting particulates in exhaust gases, and also to function as a catalyst converter for converting CO, HC, NOx and the like contained in exhaust gases. In general, burning and purifying processes of particulates are accelerated by oxygen that has been activated through reactions of oxygen, NOx and the like that take place on the surface of the catalyst such as noble metal or the like. During these burning and purifying processes of particulates, a material that is easily decomposed and converted even at a comparatively low temperature, such as SOF, CO, HC and the like, is subjected to an oxidizing reaction so that heat is generated and the catalyst and the like are heated to a high temperature; thus, it becomes possible to further improve the reaction rate for the burning and purifying processes of particulates. In other words, since the catalyst is supported on the portion 23b the partition wall that separates adjacently located large-capacity through holes 21a from each other, it becomes possible to effectively burn and remove the particulates on the portion 23b of the partition wall by utilizing the reaction heat caused upon converting SOF, CO, HC and the like.

As described above, in the honeycomb structured body according to the first aspect of the present invention, if the catalyst is supported on the portion of the partition wall that separates adjacently located through holes constituting the group of large-capacity through holes from each other, it becomes possible to suppress an increase in the pressure loss of the honey comb structured body before collecting particulates, while improving the purifying performances for particulates, and also to suppress an increase in the pressure loss upon collecting particulates.

Here, when a catalyst is supported thereon, the integral honeycomb structured body according to the first aspect of the present invention is allowed to function as a gas-purifying (gas-converting) device in the same manner as conventionally known DPFs (Diesel Particulate Filters) with a catalyst. Therefore, with respect to the case where the integral honeycomb structured body according to the first aspect of the present invention is used as a catalyst-supporting member, detailed description of the functions thereof is omitted.

In the integral honeycomb structured body according to the first aspect of the present invention, as the aperture rate α on the inlet-side of the honeycomb structured body is increased, the length of the portion of the partition wall that separates adjacently located through holes constituting the group of large-capacity through holes increases correspondingly so that, with respect to the partition wall forming the honeycomb structured body, the rate of the portions of the partition wall that separate adjacently located through holes constituting the group of large-capacity through holes increases. Here, the integral honeycomb structured body according to the first aspect of the present invention is arranged so that the thickness of the portion of the partition wall that separates through holes constituting the group of large-capacity through holes from each other is adjusted in response to the aperture rate, and this arrangement makes it possible to control the gas flow-in and flow-out operations. Moreover, by supporting a catalyst thereon depending on the gas flow-in and flow-out conditions, the integral honeycomb structured body according to the first aspect of the present invention makes it possible to uniformly set the temperature distribution of the entire filter and also to uniformly regenerate the entire filter.

In the integral honeycomb structured body according to the first aspect of the present invention having the above-mentioned arrangement, through holes are constituted by those of two types, that is, a group of large-capacity through holes and a group of small-capacity through holes, and, for example, as shown in FIG. 1A, large-capacity through holes 21a having an octagonal shape are prepared as the through holes constituting the group of large-capacity through holes, and small-capacity through holes 21b having a square shape are prepared as the through holes belonging to the group of small-capacity through holes, with the numbers of plugged through holes of the two types being set to, for example, 1 to 1 (checked pattern).

Thus, the integral honeycomb structured body according to the first aspect of the present invention has two types of the portions of the partition wall, that is, the portion 23b of the partition wall that separates the large-capacity through hole 21a and the large-capacity through hole 21a and the portion 23a of the partition wall that separates the large-capacity through hole 21a and the small-capacity through hole 21b.

In the case where the integral honeycomb structured body according to the first aspect of the present invention is used as an exhaust gas purifying filter, at the initial stage of use, exhaust gases are mainly allowed to pass through the portion 23a of the partition wall having relatively low resistance; thus, the portion 23a of the partition wall is directly exposed to high-temperature exhaust gases; in contrast, the portion 23b, the partition wall, having relatively high resistance is hardly exposed to high-temperature exhaust gases. For this reason, when a catalyst is supported on the integral honeycomb structured body according to the first aspect of the present invention, although the catalyst on the portion 23a of the partition wall reacts, the catalyst on the portion 23b the partition wall is hardly allowed to react (collecting stage 1).

However, after having been continuously used, particulates are accumulated on the portion 23a of the partition wall to increase the resistance that is imposed upon passing through the portion 23a of the partition wall; thus, the amount of exhaust gases to flow into the portion 23b of the partition wall increases. At this time, the portion 23b of the partition wall is also exposed to high-temperature exhaust gases sufficiently; thus, the catalyst on the portion 23b of the partition wall is also allowed to react (collecting stage 2).

After particulates have been accumulated on the portion 23b of the partition wall to a certain degree, exhaust gases are again mainly allowed to flow through the portion 23a of the partition wall. In this case, basically, the same processes as the collecting stage 1 are carried out (collecting stage 3).

As described above, as the collecting stage progresses, exhaust gases are allowed to flow into the portion 23b of the partition wall, and particulates are also collected by the portion 23b of the partition wall; however, relatively, the portion 23b of the partition wall hardly transmit exhaust gases due to the inherent structure thereof so that the exhaust gases are easily allowed to flow into the portion 23a of the partition wall. For this reason, oxidizing reactions of CO, HC and the like hardly occur in the portion 23b of the partition wall, and hardly cause a temperature rise therein; therefore, this makes it difficult to exert the burning reactions of particulates, and causes a temperature distribution in the honeycomb structured body and the resulting cracks therein.

In the first aspect of the present invention, the thickness of the portion 23b of the partition wall that makes it difficult for exhaust gases to flow therein is adjusted so that, even when exhaust gases the temperature of which tends to fluctuate depending on driving conditions flow therein, the honeycomb structured body is allowed to maintain stability in temperature rise and stability in catalyst reactions as a filter as a whole.

In other words, the first aspect of the present invention is characterized by the following points: the ratio of the portion 23b of the partition wall in the filter thermal capacity is made higher by making the portion 23b of the partition wall thicker than the portion 23a of the partition wall; the exhaust gas purifying (converting) process is accelerated by making the amount of supported catalyst greater in the portion 23b of the partition wall at which little exhaust gases are allowed to flow therein; and the heat generating reaction of exhaust gases in the portion 23b of the partition wall is accelerated.

Desirably, the integral honeycomb structured body 20 is mainly made from a porous ceramic material, and examples of the material may include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite and silica; and the like. Moreover, the integral honeycomb structured body 20 may be made of two or more kinds of materials such as: a composite material of silicon and silicon carbide; or aluminum titanate.

With respect to the particle diameter of the ceramic material to be used upon manufacturing the integral honeycomb structured body 20, although not particularly limited, those materials that are less likely to shrink in the succeeding firing process are desirably used, and for example, those materials, prepared by mixing 100 parts by weight of powder having an average particle diameter in the range of about 0.3 to about 50 µm and about 5 to about 65 parts by weight of powder having an average particle diameter in the range of about 0.1 to about 1.0 µm, are desirably used. By mixing ceramic powders having the above-mentioned particle diameters at the above-mentioned blending ratios, an integral honeycomb structured body made from porous ceramics can be manufactured.

Here, the plugs 22 and the partition wall 23 constituting the integral honeycomb structured body 20 are desirably made from the same porous ceramic material. This arrangement makes it possible to increase the bonding strength between the two members, and by adjusting the porosity of the plugs 22 in the same manner as that of the partition wall 23, it is possible to take the matching of the coefficient of thermal expansion of the partition wall 23 and the coefficient of thermal expansion of the plugs 22. Thus, it becomes possible to prevent the occurrence of a gap between the plugs 22 and the partition wall 23 and the occurrence of a crack in the plugs 22 or in the partition wall 23 at a portion which contacts the plug 22 due to a thermal stress that is exerted upon production as well as upon use.

Although not particularly limited, the lower limit of the porosity of the integral honeycomb structured body 20 is desirably about 20%, and the upper limit thereof is desirably about 80%. When the porosity is in the range of about 20% and about 80%, clogging of the honeycomb structured body 20 is suppressed, and sufficient strength of the honeycomb structured body is obtained; thus, the integral honeycomb structured body 20 cannot be broken easily.

Here, the above-mentioned porosity can be measured through known methods, such as a mercury injection method, Archimedes method and a measuring method using a scanning electron microscope (SEM).

The lower limit of the average pore diameter of the integral honeycomb structured body 20 is desirably about 1 µm, and the upper limit thereof is desirably about 100 μm. When the average pore diameter is in the range of about 1 μm and about 100 μm, it is not likely that particulates clog the pore. Further, particulates are not allowed to pass through the pores, so that the particulates can be collected sufficiently.

The integral honeycomb structured body 20 shown in FIG. 1A has an approximately square pillar shape. However, the shape of the integral honeycomb structured body of the present invention is not particularly limited as long as it has a pillar shape, and, for example, pillar shapes having a shape such as a polygonal shape, a round shape, an elliptical shape and a sector shape, in the cross-section perpendicular to the longitudinal direction, may be used.

Moreover, in the integral honeycomb structured body according to the first aspect of the present invention, the through holes are constituted by two types of through holes, that is, a group of large-capacity through holes with one side of the end portion of the integral honeycomb structured body according to the first aspect of the present invention being sealed so that the total sum of areas on cross sections perpendicular to the longitudinal direction is made relatively greater and a group of small-capacity through holes with the other side of the end portion of the integral honeycomb structured body according to the first aspect of the present invention being sealed so that the total sum of areas on the cross sections thereof is made relatively smaller.

In the case where a filter for purifying (converting) exhaust gases that has collected particulates and increased the pressure loss is regenerated, the particulates are burned. In addition to carbon and the like that are burned and disappear, the particulates contain metal and the like that are burned to form oxides and left as ashes in the filter for purifying (converting) exhaust gases. Since the ashes normally remain at portions closer to the outlet of the filter for purifying (converting) exhaust gases, the through holes that serve as filters for purifying (converting) exhaust gases are filled with ashes starting from a portion closer to the outlet of the filter for purifying (converting) exhaust gases, and the capacity of the portion filled with the ashes gradually increases, while the capacity (area) of a portion capable of functioning as the filter for purifying (converting) exhaust gases gradually decreases. When the amount of accumulated ashes has become too much, the through holes are no longer allowed to function as the filter. Therefore, the resulting filter is taken out of the exhaust pipe and subjected to a reverse washing process to remove the ashes from the filter for purifying (converting) exhaust gases, or the filter for purifying (converting) exhaust gases is discarded.

In comparison with another integral honeycomb structured body in which the capacity of the inlet-side through holes and the capacity of the outlet-side through holes are the same, the integral honeycomb structured body according to the first aspect of the present invention has a smaller ratio of reduction in the filtering area of the portion that functions as the exhaust gas purifying (converting) filter even after ashes accumulate, so that the pressure loss caused by the ashes becomes smaller. Thus, the integral honeycomb structured body of the present invention makes it possible to prolong a period of time until the reverse washing and the like is required, and consequently to provide a longer service life as the filter for purifying (converting) exhaust gases. Consequently, it becomes possible to greatly cut maintenance costs required for reverse washing, exchanging members and the like.

In the integral honeycomb structured body according to the first aspect of the present invention, particulates are accumulated uniformly not only on the portion 23a of the partition wall separating a large-capacity through hole (inlet-side through hole) 21a and an adjacent small-capacity through hole (outlet-side through hole) 21b from each other, but also on the portion 23b the partition wall separating adjacently located large-capacity through holes (inlet-side through holes) 21a from each other. The reason for this is explained as follows: since, immediately after the start of collecting particulates, gases flow from the large-capacity through holes (inlet-side through holes) 21a toward the small-capacity through holes (outlet-side through holes) 21b, the particulates are accumulated on the portion 23a of the partition wall separating a large-capacity through hole 21a and a small-capacity through hole 21b; however, as the particulate collecting process progresses to form a cake layer, it becomes difficult for the gases to pass through the portion 23a of the partition wall separating a large-capacity through hole 21a and a small-capacity through hole 21b; thus, gas flows gradually occur also in the portion 23b of the partition wall separating large-capacity through holes 21a. Consequently, after particulates have been collected for a certain period of time, particulates are gradually allowed to uniformly deposit on the partition wall 23 of the large-capacity through holes (inlet-side through holes) 21a.

Therefore, when compared with a filter having no portion 23b of the partition wall that separates adjacently located large-capacity through holes (inlet-side through holes) 21a from each other with the aperture rate being set to a constant value, the integral honeycomb structured body of the present invention, which has a larger surface area of partition wall 23 used for filtering, makes it possible to reduce the thickness of particulates accumulated on the portion of the partition wall 23 when the same amount of particulates are accumulated thereon. For this reason, the integral honeycomb structured body of the present invention makes it possible to reduce a rate of increase in the pressure loss that increases as time elapses since the start of the use, to reduce the pressure loss in view of the entire service life as the filter, and consequently to prolong the period up to the regenerating process.

In the integral honeycomb structured body according to the first aspect of the present invention having the structure as shown in FIG. 1, the shape of a cross section perpendicular to the longitudinal direction of the through holes constituting the group of large-capacity through holes and/or the through holes constituting the group of small-capacity through holes is desirably formed into a polygonal shape. Even when the area of the partition wall in a cross section perpendicular to the longitudinal direction of the honeycomb structured body is reduced to increase the aperture ratio, this polygonal shape makes it possible to achieve a honeycomb structured body that has an excellent durability and has a long service life. Among polygonal shapes, a polygon having four or more angles is desirably used and, more desirably, at least one of the angles is an obtuse angle. With this arrangement, it becomes possible to reduce a pressure loss caused by friction of exhaust gases upon passing through the through holes. Here, only the cross section of the through holes constituting the group of large-capacity through holes may be a polygon, such as a quadrangle, a pentagon, a trapezoid and an octagon, or only the cross section of the through holes constituting the group of small-capacity through holes may be the above-mentioned polygon, or both of them may be a polygon. In particular, the shape of a cross section perpendicular to the longitudinal direction of the through holes constituting the group of large-capacity through holes is desirably an octagonal shape, with the shape of the cross section of the through holes constituting the group of small-capacity through holes being desirably a quadrangle shape.

In the integral honeycomb structured body according to the first aspect of the present invention, the ratio of cross-sectional areas perpendicular to the longitudinal direction of the group of large-capacity through holes and cross-sectional areas perpendicular to the longitudinal direction of the group of small-capacity through holes (cross-sectional areas of the group of large-capacity through holes/cross-sectional areas of the group of small-capacity through holes; hereinafter, also referred to as the ratio of aperture rates) is desirably set to have a lower limit value of about 1.5, and the upper limit value thereof is desirably set to about 2.7. When the ratio of aperture rates is about 1.5 or more, the effects of preparing the group of large-capacity through holes and the group of small-capacity through holes are easily obtained. On the other hand, when the ratio of aperture rates is about 2.7 or less, the capacity of the group of small-capacity through holes is large; thus, the pressure loss prior to collecting particulates becomes small.

In the integral honeycomb structured body according to the first aspect of the present invention, the vicinity of each of corners on the cross section perpendicular to the longitudinal direction of the through holes constituting the group of large-capacity through holes and/or the through holes constituting the group of small-capacity through holes is desirably formed by a curved line. By forming the corner into a curved line, it becomes possible to prevent a stress from concentrating on the corner portions of the through holes and the subsequent occurrence of cracks, and also to reduce a pressure loss due to friction caused by exhaust gases passing through the through holes.

In the integral honeycomb structured body according to the first aspect of the present invention, the distance between centers of gravity on a cross section perpendicular to the longitudinal direction of the adjacently located through holes constituting the group of large-capacity through holes is desirably equal to the distance between centers of gravity on a cross section perpendicular to the longitudinal direction of the adjacently located through holes constituting the group of small-capacity through holes. With this arrangement, upon regenerating, heat is uniformly dispersed so that the temperature distribution is easily made uniform. Thus, it becomes possible to provide a honeycomb structured body that has an excellent durability and is less likely to generate cracks due to a thermal stress even after repetitive uses for a long time.

In the present invention, the term "the distance between centers of gravity on a cross section perpendicular to the longitudinal direction of the adjacently located through holes constituting the group of large-capacity through holes" represents the smallest distance between the center of gravity on a cross section perpendicular to the longitudinal direction of one through hole constituting the group of large-capacity through holes and the center of gravity on the cross section of another through hole constituting the group of large-capacity through holes. The term "the distance between centers of gravity on a cross section of the adjacently located through holes constituting the group of small-capacity through holes" represents the smallest distance between the center of gravity on a cross section perpendicular to the longitudinal direction of one through hole constituting the group of small-capacity through holes and the center of gravity on the cross section of another through hole constituting the group of small-capacity through holes.

Moreover, in the integral honeycomb structured body 20, the large-capacity through holes 21a and the small-capacity through holes 21b are alternately arranged in the vertical direction as well as in the horizontal direction with a partition wall 23 interposed therebetween, and, in each of the directions, the center of gravity on a cross section perpendicular to the longitudinal direction of each of the large-capacity through holes 21a and the center of gravity on a cross section perpendicular to the longitudinal direction of each of the small-capacity through holes 21b are located on a straight line.

Therefore, "the distance between centers of gravity on a cross section perpendicular to the longitudinal direction of the adjacently located through holes constituting the group of large-capacity through holes" and "the distance between centers of gravity on the cross section of the adjacently located through holes constituting the group of small-capacity through holes" refer to a distance between centers of gravity of large-capacity through holes 21a that are diagonally adjacent to each other and small-capacity through holes 21b that are diagonally adjacent to each other in a cross section perpendicular to the longitudinal direction of the integral honeycomb structured body 20 of the present invention.

Figure 2:
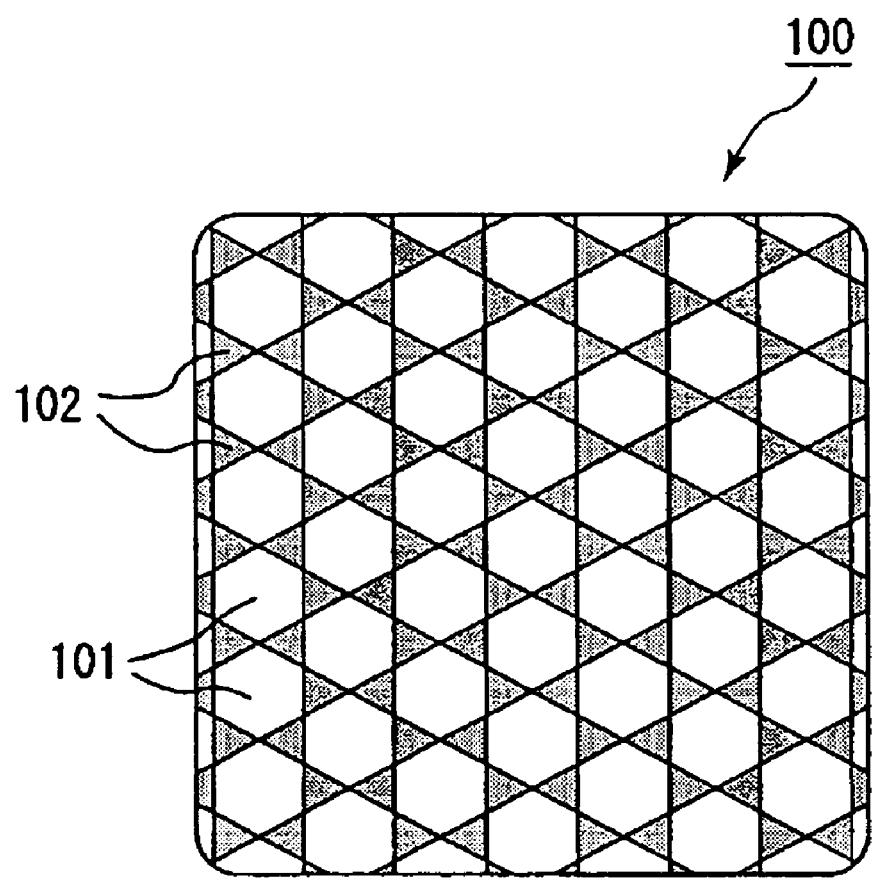
FIG. 2 is a cross-sectional view that schematically shows a cross section perpendicular to the longitudinal direction of a honeycomb structured body of the present invention in which the number of large-capacity through holes 101 and the number of small-capacity through holes 102 are substantially set to approximately 1:2.

In the integral honeycomb structured body according to the first aspect of the present invention, although not particularly limited, the number of through holes constituting the group of large-capacity through holes and the number of through holes constituting the group of small-capacity through holes are desirably set to substantially the same number. With this arrangement, it is possible to minimize the number of partition walls that hardly devote to filtration of exhaust gases, and consequently to prevent the pressure loss caused by friction due to gases passing through the inlet-side through holes and/or friction due to gases passing through the outlet-side through holes from rising over the necessary level. For example, in comparison with a honeycomb structured body 100 in which the numbers of through holes between the large-capacity through holes 101 and the small-capacity through holes 102 are substantially set to approximately 1:2, as shown in FIG. 2, the structure in which the numbers of the through holes are set to substantially the same number makes it possible to reduce the pressure loss caused by friction due to gases passing through the outlet-side through holes, and consequently to reduce the pressure loss with respect to the honeycomb structured body as a whole.

The following description will discuss specific examples of structures of through holes constituting the group of large-capacity through holes and through holes constituting the group of small-capacity through holes on the cross section perpendicular to the longitudinal direction of the integral honeycomb structured body according to the first aspect of the present invention.

Figure 3A:
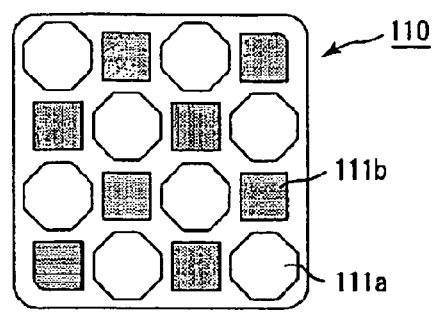
FIGS. 3A to 3D are cross-sectional views each of which schematically shows a cross section perpendicular to the longitudinal direction of an integral honeycomb structured body of the present invention.
Figure 3B:
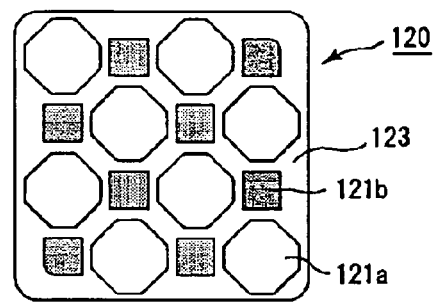
Figure 3C:
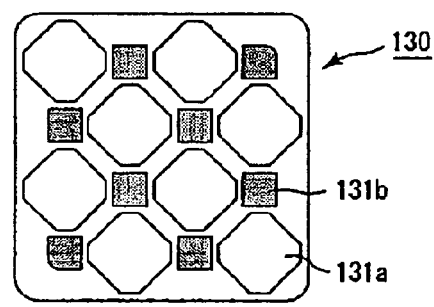
Figure 3D:
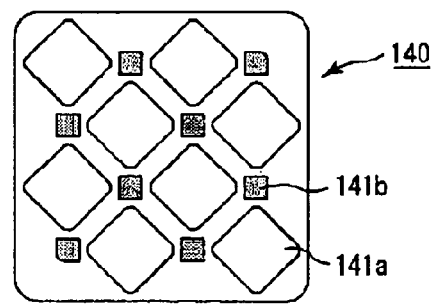
Figure 3E:
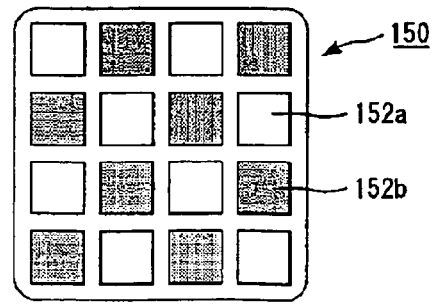
FIG. 3E is a cross-sectional view that schematically shows a cross section perpendicular to the longitudinal direction of a conventional integral honeycomb structured body.

FIGS. 3A to 3D and FIGS. 4A to 4F are cross-sectional views each of which schematically shows a cross section perpendicular to the longitudinal direction in the integral honeycomb structured body according to the first aspect of the present invention; and FIG. 3E is a cross-sectional view that schematically shows a cross section perpendicular to the longitudinal direction in a conventional integral honeycomb structured body.

In the integral honeycomb structured body 110 shown in FIG. 3A, the ratio of aperture ratios is about 1.55; in the integral honeycomb structured body 120 shown in FIG. 3B, the ratio is about 2.54; in the integral honeycomb structured body 130 shown in FIG. 3C, the ratio is about 4.45; and in the integral honeycomb structured body 140 shown in FIG. 3D, the ratio is about 6.00. Moreover, in FIGS. 4A, 4C and 4E, all the ratios of aperture ratios are about 4.45, and in FIGS. 4B, 4D and 4F, all the ratios of aperture ratios are about 6.00.

Here, in the case where the ratio of aperture ratios is great as indicated by the integral honeycomb structured body 140 of FIG. 3D, the initial pressure loss tends to become too high since the capacity of the small-capacity through holes 141*b* forming the group of outlet-side through holes becomes too small.

In FIGS. 3A to 3D, all the cross-sectional shapes of large-capacity through holes 111*a*, 121*a*, 131*a* and 141*a* are an octagon, and each of the cross-sectional shapes of small-capacity through holes 111*b*, 121*b*, 131*b* and 141*b* is a quadrangle (square), and these through holes are alternately arranged respectively; thus, by changing the cross-sectional area of the small-capacity through holes and also slightly changing the cross-sectional shape of the large-capacity through holes, it is possible to easily vary the ratio of aperture ratios arbitrarily. In the same manner, with respect to the integral honeycomb structured body shown in FIGS. 4A to 4F, it is also possible to easily vary the ratio of aperture ratios arbitrarily. Moreover, as shown in FIGS. 3A to 3D, it is desirable to provide chamfered portions on corner portions on the periphery of the integral honeycomb structured body of the present invention.

Here, in an integral honeycomb structured body 150 shown in FIG. 3E, both of the cross-sectional shapes of inlet-side through holes 152*a* and outlet-side through holes 152*b* are quadrangle shapes, and alternately arranged respectively.

Figure 4A:
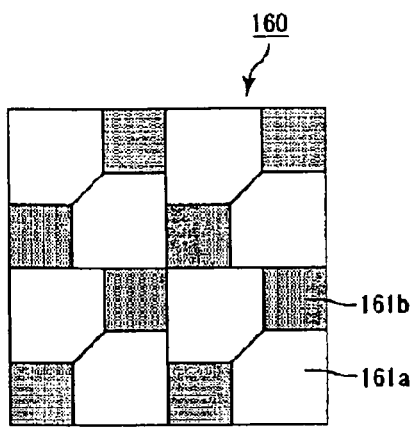
FIGS. 4A to 4F are cross-sectional views each of which schematically shows one portion of a cross section perpendicular to the longitudinal direction of an integral honeycomb structured body of the present invention.
Figure 4B:
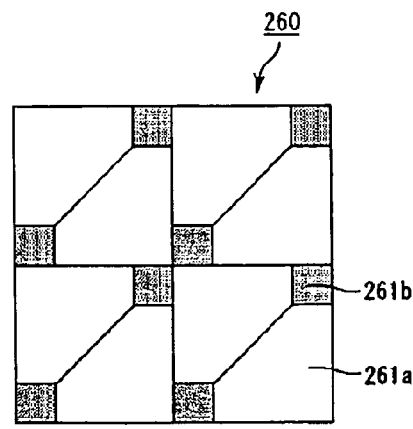
Figure 4C:
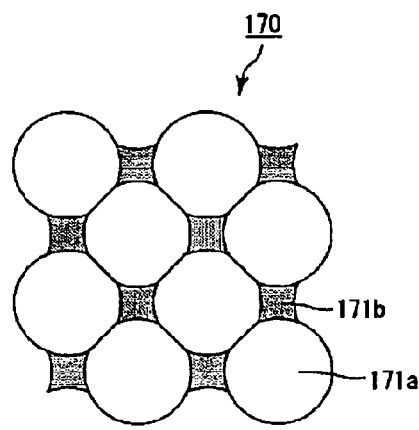
Figure 4D:
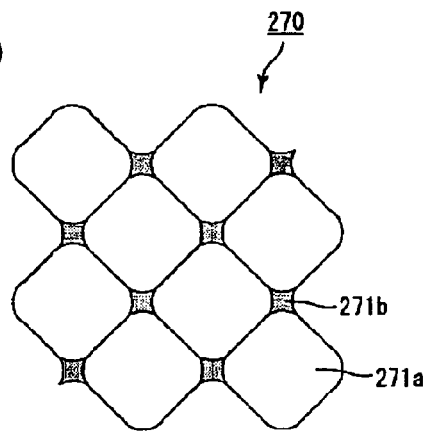
Figure 4E:
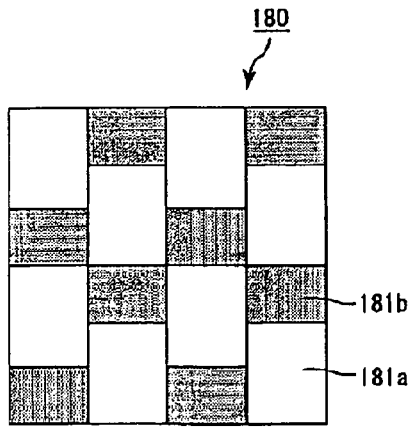
Figure 4F:
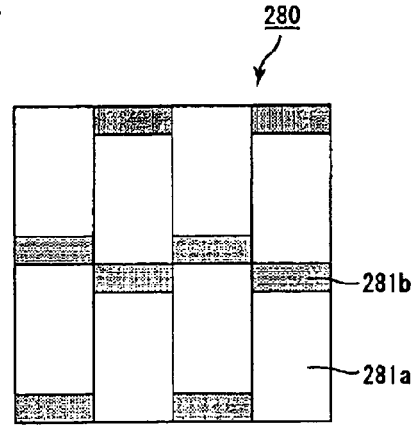

In integral honeycomb structured bodies 160, 260 shown in FIGS. 4A and 4B, the cross-sectional shape of each of the large-capacity through holes 161*a* and 261*a* is a pentagon, and in this shape, three angles thereof are set to approximately right angles, and the cross-sectional shapes of small-capacity through holes 161*b* and 261*b* is a quadrangle and the small-capacity through holes are allowed to respectively occupy portions of a larger quadrangle that diagonally face each other. In integral honeycomb structured bodies 170, 270 shown in FIGS. 4C and 4D, are modified shapes of the cross-sectional shapes shown in FIGS. 3A to 3D, and the shape is formed by expanding a partition wall commonly possessed by each of the large-capacity through holes 171*a*, 271*a* and each of the small-capacity through holes 171*b*, 271*b* toward the small-capacity through hole side with a predetermined curvature. This curvature is optionally set, and the curved line forming the partition wall may correspond to, for example, a ¼ of a circle. In this case, the above-mentioned ratio of aperture ratios is about 3.66. Therefore, in the integral honeycomb structured bodies 170, 270, shown in FIGS. 4C and 4D, the area of the cross section of each of the small-capacity through holes 171*b*, 271*b* is made further smaller compared to the case in which the curved line forming the partition wall corresponds to a ¼ of a circle. In integral honeycomb structured bodies 180, 280 shown in FIGS. 4E and 4F, the cross-sectional shape of each of the large-capacity through holes 181*a*, 281*a*, as well as each of the small-capacity through holes 181*b*, 281*b*, is a quadrangle (rectangle) so that when two of the large-capacity through holes and two of the small-capacity through holes are combined together, an approximately square shape is formed.

Figure 5:
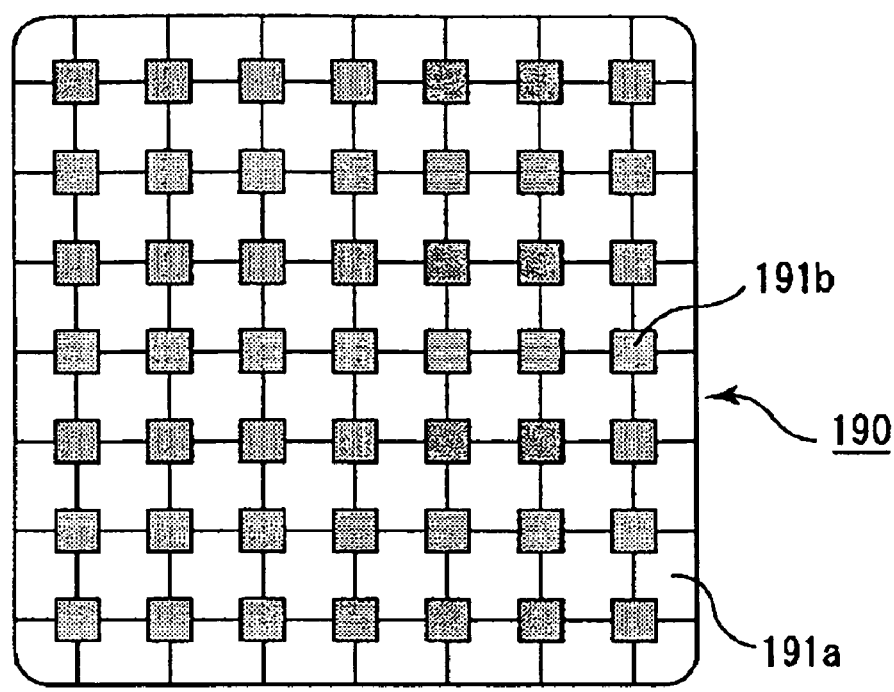
FIG. 5 is a cross-sectional view that schematically shows one example of a cross section perpendicular to the longitudinal direction of an integral honeycomb structured body of the present invention.
Figure 6A:
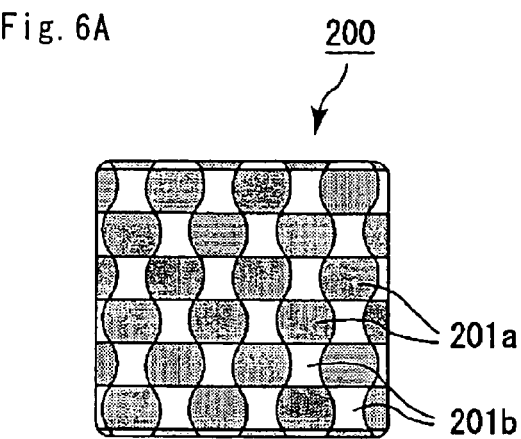
FIGS. 6A to 6D are cross-sectional views each of which schematically shows one example of a cross section perpendicular to the longitudinal direction of an integral honeycomb structured body of the present invention.
Figure 6B:
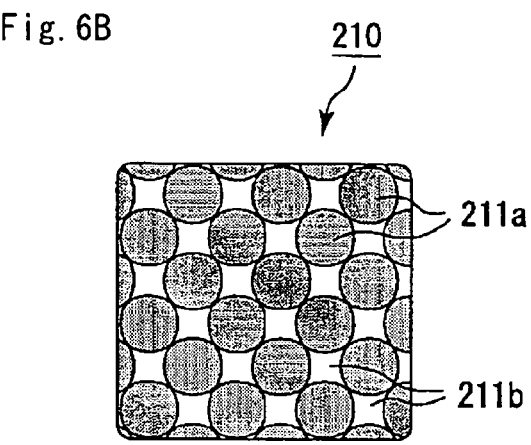
Figure 6C:
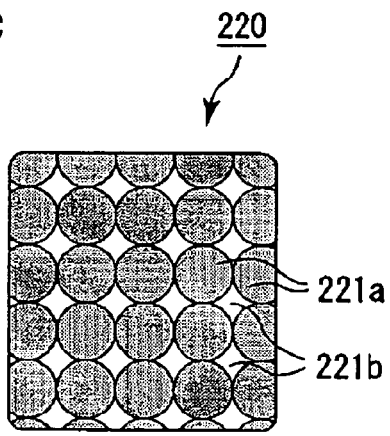
Figure 6D:
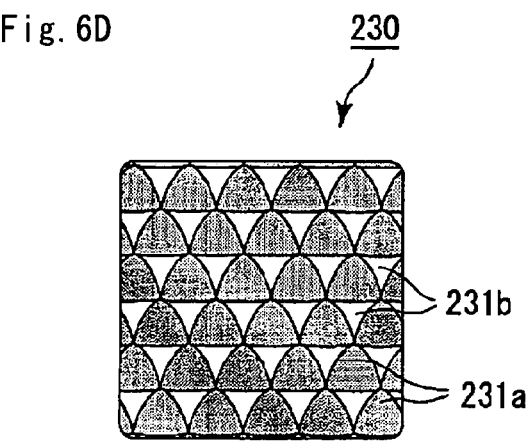

Other specific examples of structures of through holes constituting the group of large-capacity through holes and through holes constituting the group of small-capacity through holes in the cross section perpendicular to the longitudinal direction of the integral honeycomb structured body according to the first aspect of the present invention, may include, for example, an integral honeycomb structured body 190 as shown in FIG. 5 having large-capacity through holes 191*a* and small-capacity through holes 191*b*, and each of integral honeycomb structured bodies 200, 210, 220, 230 as shown in FIGS. 6A to 6D having large-capacity through holes 201*a*, 211*a*, 221*a*, 231*a* and small-capacity through holes 201*b*, 211*b*, 221*b*, 231*b*, respectively, and of the like structures.

In accordance with the honeycomb structured body of the first aspect of the present invention, since the relationship between the aperture rate $\alpha$ on the inlet-side and the difference $\beta$ in thickness between the respective portions of partition walls is adjusted so as to satisfy the above-mentioned inequalities (1) and (2), a catalyst can be sufficiently supported on a portion of the partition wall that separates adjacently located through holes constituting the group of large-capacity through holes, with an increase in the pressure loss being suppressed prior to collecting particulates. In accordance with the honeycomb structured body of the first aspect of the present invention, by supporting the catalyst on the portion of the partition wall, it becomes possible to improve purifying performances for particulates and also to suppress an increase in the pressure loss upon collecting particulates. In particular, when the relationship between the aperture rate $\alpha$ on the inlet-side and the difference $\beta$ in thickness between the respective portions of partition walls is adjusted in a manner so as to satisfy the above-mentioned inequality (3), a catalyst can be sufficiently supported on a portion of the partition wall that separates adjacently located through holes constituting the group of large-capacity through holes more effectively, with an increase in the pressure loss of the honeycomb structured body being suppressed at the state prior to collecting particulates.

In the honeycomb structured body of the first aspect of the present invention, when a catalyst is supported on the portion of the partition wall that separates adjacently located through holes constituting the group of large-capacity through holes from each other, it is possible to improve a purifying performance of particulates while reducing an increase in the pressure loss of the honeycomb structured body prior to collecting particulates, and also to suppress an increase in the pressure loss upon collecting particulates.

In accordance with the honeycomb structured body of the first aspect of the present invention, when the through holes constituting the group of large-capacity through holes and/or the through holes constituting the group of small-capacity through holes have a cross-sectional shape perpendicular to the longitudinal direction thereof formed into a polygonal shape, even in the case where the area of the partition wall on the cross section perpendicular to the longitudinal direction is reduced with an increased aperture rate so as to reduce the pressure loss, it becomes possible to achieve a honeycomb structured body that is superior in durability and has a long service life. Moreover, in the case where the cross-sectional shape perpendicular to the longitudinal direction of the through holes constituting the group of large-capacity through holes is formed into an octagonal shape, and the cross-sectional shape of the through holes constituting the group of small-capacity through holes is formed into a quadrangular shape, it becomes possible to achieve a honeycomb structured body that is more superior in durability and has a longer service life.

In accordance with the honeycomb structured body of the first aspect of the present invention, when the area on a cross section perpendicular to the longitudinal direction of the through holes constituting the group of large-capacity through holes and the area on the cross sections of the group of small-capacity through holes are set to a ratio in the range of about 1.5 to about 2.7, it is possible to relatively increase the aperture rate on the inlet-side and to consequently suppress an increase in pressure loss upon collecting particulates, and also to prevent the pressure loss prior to collecting particulates from becoming too high.

In the honeycomb structured body of the first aspect of the present invention, on the cross section perpendicular to the longitudinal direction, when at least one of angles formed by a crossing of the portion of the partition wall that separates adjacent through holes constituting the group of large-capacity through holes and the portion of the partition wall that separates adjacent through holes, one of which constituting the group of large-capacity through holes and the other of which constituting the group of small-capacity through holes, is an obtuse angle, it is possible to reduce the pressure loss.

In the honeycomb structured body of the first aspect of the present invention, on the cross section perpendicular to the longitudinal direction, when the vicinity of each of corners of the through hole constituting the group of the large-capacity through holes and/or the through hole constituting the group of the small-capacity through holes is formed by a curved line, it becomes possible to prevent a stress from concentrating on corners of the through hole, as well as preventing occurrence of cracks, and also to reduce the pressure loss.

In the honeycomb structured body of the first aspect of the present invention, when the distance between centers of gravity on a cross section perpendicular to the longitudinal direction of adjacent through holes constituting the group of the large-capacity through holes is equal to the distance between centers of gravity on a cross section perpendicular to the longitudinal direction of adjacent through holes constituting the group of the small-capacity through holes, upon regenerating, it is possible to uniformly disperse heat to easily prepare a uniform temperature distribution, and consequently to provide a honeycomb structured body having superior durability free from cracks caused by a thermal stress, even after long-term repetitive use.

The honeycomb structured body according to the second aspect of the present invention is a pillar-shaped honeycomb structured body comprising a large number of through holes that are longitudinally placed in parallel with one another with a partition wall therebetween, wherein the large number of through holes include a group of large-capacity through holes being sealed at one side of an end portion of the honeycomb structured body, so that the sum of areas on a cross section perpendicular to the longitudinal direction is made relatively larger, and a group of small-capacity through holes being sealed at the other side of the end portion of the honeycomb structured body, so that the sum of areas on the cross section is made relatively smaller; a catalyst is supported on a portion of the partition wall that separates adjacently located through holes of the group of large-capacity through holes from each other, and on a portion of the partition wall that separates adjacently located through holes, one of which constituting the group of large-capacity through holes and the other of which constituting the group of small-capacity through holes; and a ratio of: the concentration of the catalyst supported on the portion of the partition wall that separates the adjacently located through holes constituting the group of large-capacity through holes from each other, to the concentration of the catalyst supported on the portion of the partition wall that separates the adjacently located through holes, one of which constituting the group of large-capacity through holes and the other of which constituting the group of small-capacity through holes, is in the range of about 1.1 to about 3.0.

More specifically, it is desirable that platinum is used as the catalyst, with the concentration of platinum deposited on the portions of the partition wall that separate adjacently located through holes constituting the group of large-capacity through holes and the concentration of platinum deposited on the portions of the partition wall that separate adjacently located through holes one of which constituting the group of large-capacity through holes and the other of which constituting the group of small-capacity through holes having a ratio in the range of about 1.1 to about 3.0.

In accordance with the honeycomb structured body of the second aspect of the present invention, since the concentration of the catalyst supported on the portion of the partition wall that separates the adjacently located throughholes constituting the group of large-capacity through holes and the concentration of the catalyst supported on the portion of the partition wall that separates the adjacently located through holes one of which constituting the group of large-capacity through holes and the other of which constituting the group of small-capacity through holes are adjusted to have a ratio in the range of about 1.1 to about 3.0, it becomes possible to improve the particulate purifying performance while suppressing an increase in the pressure loss prior to collecting particulates, and also to prevent an increase in the pressure loss upon collecting particulates. When the partition wall catalyst concentration ratio is in the range of about 1.1 to about 3.0, the amount of the catalyst supported on the portion of the partition wall that separates adjacently located through holes constituting the group of large-capacity through holes is enough to sufficiently improve the particulate purifying performance. Further, the amount of the catalyst supported on the portion of the partition wall that separates adjacently located through holes, one of which constituting the group of large-capacity through holes and the other of which constituting the group of small-capacity through holes, does not become large, so that the pressure loss prior to collecting particulates does not increase. Moreover, the catalyst sintering is inhibited under a high-temperature environment such as being used in an exhaust gas purifying device; thus, a reduction of the catalyst activity is suppressed, and a reduction in the regenerating rate (rate of particulates to be burned and purified) in the regenerating process of the filter may also be suppressed. Incidentally, if the ratio exceeds about 3.0, it is not possible to greatly improve the particulate purifying performance although the catalyst is supported on the portion of the partition wall that separates adjacently located through holes constituting the group of large-capacity through holes.

In the honeycomb structured body according to the second aspect of the present invention, the concentration of the catalyst supported on the portion of the partition wall that separates adjacently located through holes constituting the group of large-capacity through holes is improved so that the number of reaction sites for the catalyst reaction is increased, and in the honeycomb structured body according to the first aspect of the present invention, on the other hand, a portion of the partition wall that separates adjacently located through holes constituting the group of large-capacity through holes is made relatively thicker so that the number of reaction sites for the catalyst reaction is increased. Therefore, with respect to its constituent materials and structures including the cross-sectional shape perpendicular to the longitudinal direction, the honeycomb structured body according to the second aspect of the present invention may have the same structure as the honeycomb structured body according to the first aspect of the present invention in which a catalyst is supported on a portion of the partition wall that separates adjacently located through holes constituting the group of large-capacity through holes, and is allowed to achieve the same effects.

In accordance with the honeycomb structured body of the second aspect of the present invention, since a ratio of: the concentration of the catalyst supported on the portion of the partition wall that separates the adjacently located through holes constituting the group of large-capacity through holes from each other, to the concentration of the catalyst supported on the portion of the partition wall that separates the adjacently located through holes, one of which constituting the group of large-capacity through holes and the other of which constituting the group of small-capacity through holes, is set in the range of about 1.1 to about 3.0, it becomes possible to improve a purifying performance of particulates, while suppressing an increase in the pressure loss prior to collecting particulates, and also to suppress an increase in the pressure loss upon collecting particulates.

Only a single integral honeycomb structured body according to the first or second aspect of the present invention may be used as an integral-type filter. More desirably, a plurality of them may be combined together through a sealing material layer, and used as an aggregated-type filer. The aggregated-type filter makes it possible to reduce a thermal stress by the sealing material layer to improve the heat resistance of the filter. Further, the size and the like of the filter can be freely adjusted by increasing or decreasing the number of the integral honeycomb structured bodies according to the first or second aspect of the present invention.

Here, both the integral-type filter and the aggregated-type filter have the same functions.

In the integral-type filter formed by the integral honeycomb structured body according to the first or second aspect of the present invention, an oxide ceramic material such as cordierite is normally used as its material. This material makes it possible to cut manufacturing costs, and since this material has a comparatively small coefficient of thermal expansion, it is possible to make the filter less likely to receive damage due to a thermal stress that is exerted during production as well as during use.

In the integral-type filter formed by the integral honeycomb structured body according to the first or second aspect of the present invention, although not shown in FIG. 1, a sealing material layer, made from a material that hardly lets gases pass through in comparison with the integral honeycomb structured body according to the first or second aspect of the present invention, is desirably formed on the peripheral face thereof in the same manner as the aggregated honeycomb structured body of the present invention which will be described later. In the case where the sealing material layer is formed on the peripheral face, the integral honeycomb structured body according to the first or second aspect of the present invention is compressed by the sealing material layer, so that it is possible to increase the strength, and also to prevent isolation of ceramic particles due to occurrence of cracks.

The aggregated honeycomb structured body according to the third aspect of the present invention is the one in which a sealing material layer is made from a material that hardly lets gases pass through in comparison with the integral honeycomb structured body according to the first or second aspect of the present invention is formed on the peripheral face of the honeycomb block which is formed by combining together a plurality of the integral honeycomb structured bodies according to the first or second aspect of the present invention through a sealing material layer, and functions as an aggregated-type filter.

Figure 7:
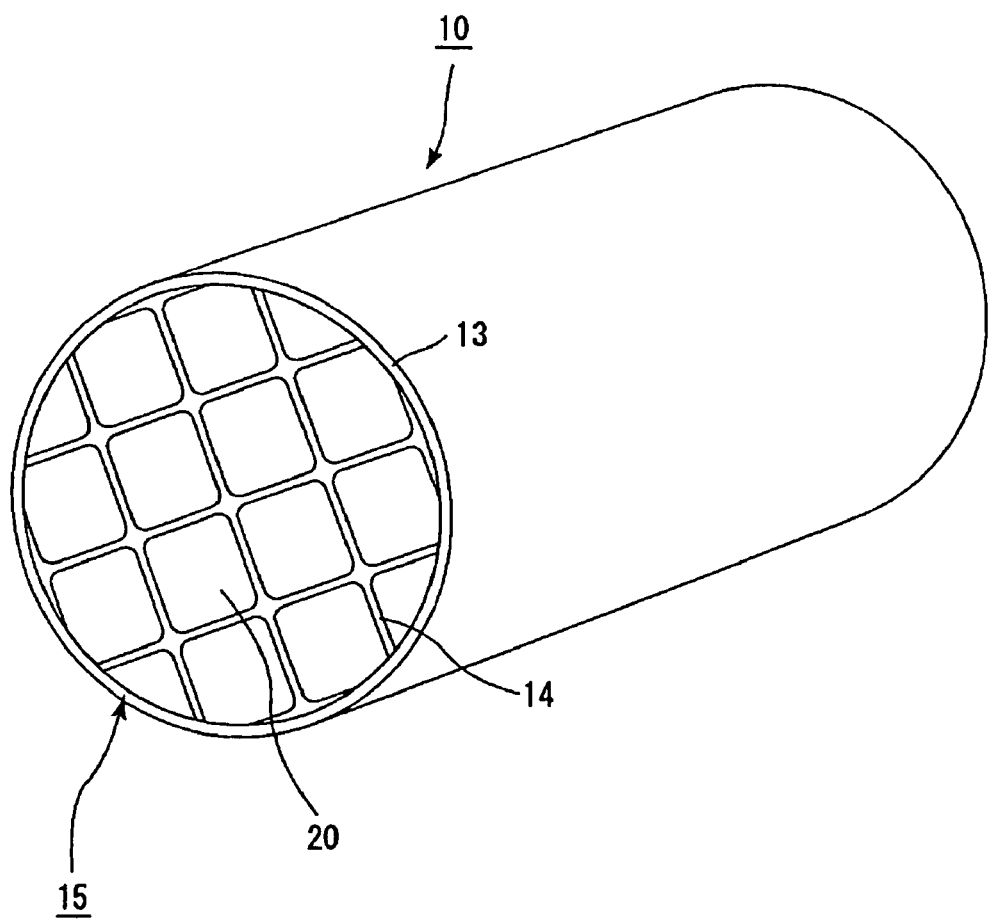
FIG. 7 is a perspective view that schematically shows one example of an aggregated honeycomb structured body of the present invention.

FIG. 7 is a perspective view that schematically shows one example of the aggregated honeycomb structured body of the present invention. In the aggregated honeycomb structured body shown in FIG. 7, a number of through holes are constituted by a group of large-capacity through holes being sealed at one of the end portions of the honeycomb structured body so that the sum of areas on the cross section perpendicular to the longitudinal direction is made relatively greater, and a group of small-capacity through holes being sealed at the other end portion of the honeycomb structured body so that the some of areas on the cross section is made relatively smaller.

In this case, as described earlier, the total sum of areas in the cross sections is defined so as not to include portions occupied by sealing material layers, which will be described below.

As shown in FIG. 7, the aggregated honeycomb structured body 10, which is used as a filter for purifying (converting) exhaust gases, has a structure in which a plurality of the integral honeycomb structured bodies 20 are combined together through a sealing material layer 14 to form a honeycomb block 15, with a sealing material layer 13 for preventing leakage of exhaust gases formed on the periphery of the honeycomb block 15. Here, the sealing material layer 13 is made from a material that hardly lets gases pass through in comparison with the integral honeycomb structured body 20.

Here, in the aggregated honeycomb structured body 10, silicon carbide, which is superior in thermal conductivity, heat resistance, mechanical properties, chemical resistance and the like, is desirably used as a material for constituting the integral honeycomb structured body 20.

In the aggregated honeycomb structured body 10, the sealing material layer 14, which is formed between the integral ceramic structured bodies 20, desirably serves as an adhesive that bonds a plurality of the integral ceramic structured bodies 20 to one another. The sealing material layer 13, on the other hand, which is formed on the peripheral face of the honeycomb block 15, serves as a sealing member that prevents exhaust gases that pass through the through holes from leaking from the peripheral face of the honeycomb block 15, when the aggregated honeycomb structured body 10 is placed in an exhaust passage in an internal combustion engine.

Here, in the aggregated honeycomb structured body 10, the sealing material layer 13 and the sealing material layer 14 may be made from the same material, or may be made from different materials. In the case where the sealing material layer 13 and the sealing material layer 14 are made from the same material, the blending ratio of the materials may be the same or different from each other.

The sealing material layer 14 may be made from a dense material or may be made from a porous material so as to allow exhaust gases to flow therein. However, the sealing material layer 13 is desirably made from a dense material. This is because the sealing material layer 13 is formed so as to prevent leakage of exhaust gases from the peripheral face of the ceramic block 15 when the aggregated honeycomb structured body 10 is placed in an exhaust passage of an internal combustion engine.

With respect to the material for forming the sealing material layers 13 and 14, examples thereof are not particularly limited and may include a material comprising inorganic fibers and/or inorganic particles in addition to an inorganic binder and an organic binder.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof may include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof may include ceramic fibers such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof may include carbides, nitrides and the like, and specific examples may include inorganic powder, whiskers and the like made from silicon carbide, silicon nitride, boron nitride and the like. Each of these may be used alone, or two or more kinds of these may be used in combination. Among the inorganic particles, silicon carbide having an excellent thermal conductivity is desirably used.

In the case where the integral honeycomb structured body according to the first or second aspect of the present invention, as it is, is used as a filter for purifying (converting) exhaust gases as described above, the sealing material layer that is the same as that of the aggregated honeycomb structured body of the present invention may be formed on the peripheral face of the integral honeycomb structured body according to the first or second aspect of the present invention.

The aggregated honeycomb structured body 10 shown in FIG. 7 has a cylindrical shape. However, the shape of the aggregated honeycomb structured body of the present invention is not particularly limited as long as it is a pillar-shaped body, and may be, for example, a pillar-shape with a cross-sectional shape perpendicular to the longitudinal direction being a polygonal shape, an elliptical shape and the like.

The aggregated honeycomb structured body of the present invention may be manufactured by: processes in which, after a plurality of integral honeycomb structured bodies according to the first or second aspect of the present invention have been combined together, the peripheral portion thereof is machined so as to form the cross-sectional shape into a polygonal shape, a round shape, an elliptical shape or the like; or processes in which, after the cross section of the integral honeycomb structured bodies according to the first or second aspect of the present invention have been preliminarily machined, the resulting structured bodies are combined together by using an adhesive so as to form the cross-sectional shape into a polygonal shape, around shape, an elliptical shape or the like; or processes in which, after the integral honeycomb structured bodies according to the first or second aspect of the present invention have been molded so as to manufacture each of the cross-sectional shapes thereof into a desired shape, the resulting structured bodies are combined together by using an adhesive so as to form the cross section into a polygonal shape, a round shape, an elliptical shape or the like. For example, four pillar-shaped integral honeycomb structured bodies according to the first or second aspect of the present invention, each having a sector shape on its cross-sectional shape that is one of four equally divided portions of a circle, may be combined together to manufacture a cylindrical aggregated honeycomb structured body of the present invention.

In accordance with the honeycomb structured body of the third aspect of the present invention, since a plurality of the honeycomb structured bodies in accordance with the first or second aspect of the present invention are combined with one another through sealing material layers, the sealing material layers make it possible to reduce a thermal stress, and consequently to improve the heat resistance, and the size thereof can be freely adjusted by increasing or reducing the number of the honeycomb structured body of the first or second aspect of the present invention.

Next, the following description will discuss one example of a manufacturing method for the above-mentioned honeycomb structured body of the present invention.

In the case where the honeycomb structured body of the present invention is an integral-type filter in which the entire structure is made of a single sintered body, first, an extrusion-molding process is carried out by using the material paste mainly composed of the above-mentioned ceramics so that a ceramic formed body having approximately the same shape as the integral honeycomb structured body of the present invention is manufactured.

In this case, for example, metal molds that are used for extrusion-molding having two types of through holes, that is, large-capacity through holes and small-capacity through holes, are selected in accordance with the densities of the through holes.

Here, in the case where the integral honeycomb structured body according to the first aspect of the present invention is manufactured, the ceramic molded body is manufactured so as to satisfy the above-mentioned inequalities (1) and (2).

Although the material paste is not particularly limited, material paste which sets the porosity of the integral honeycomb structured body according to the first or second aspect of the present invention after the manufacturing process in the range of about 20% to about 80% is desirable, and, for example, a material paste prepared by adding a binder, a dispersant solution and the like to powder made from the above-mentioned ceramics may be used.

The above-mentioned binder is not particularly limited, and examples thereof may include methyl cellulose, carboxymethyl cellulose, hydroxyethyl cellulose, polyethylene glycol, phenol resins, epoxy resins and the like.

Normally, the blend ratio of the above-mentioned binder is desirably about 1 to about 10 parts by weight to 100 parts by weight of ceramic powder.

The above-mentioned dispersant solution is not particularly limited, and, for example, an organic solvent such as benzene, alcohol such as methanol, water and the like may be used.

An appropriate amount of the above-mentioned dispersant solution is blended so that the viscosity of the material paste is set in a predetermined range.

These ceramic powder, binder and dispersant solution are mixed by an attritor or the like, and sufficiently kneaded by a kneader or the like, and then extrusion-molded.

Moreover, a molding auxiliary may be added to the above-mentioned material paste, if necessary.

The molding auxiliary is not particularly limited, and examples thereof may include ethylene glycol, dextrin, fatty acid soap, polyalcohol and the like.

Furthermore, a pore-forming agent, such as balloons that are fine hollow spheres composed of oxide-based ceramics, spherical acrylic particles or graphite, may be added to the above-mentioned material paste, if necessary.

The above-mentioned balloons are not particularly limited and, for example, alumina balloons, glass micro-balloons, shirasu balloons, fly ash balloons (FA balloons), mullite balloons and the like may be used. Among these, fly ash balloons are more desirably used.

Next, the above-mentioned ceramic formed body is dried by using a micro-wave dryer, a hot-air dryer, a dielectric dryer, a decompression dryer, a vacuum dryer, a freeze dryer or the like to form a ceramic dried body. Next, a predetermined amount of plug paste, which forms plugs, is injected into ends on the outlet-side of the large-capacity through holes and ends on the inlet-side of the small-capacity through holes so as to seal the through holes.

Although the above-mentioned plug paste is not particularly limited, the plug paste which sets the porosity of a plug manufactured through the following processes in the range of about 20% to about 80% is desirable and, for example, the same material paste as described above may be used. However, those pastes, prepared by adding a lubricant, a solvent, a dispersant, a binder and the like to ceramic powder used as the above-mentioned material paste, are desirably used. With this arrangement, it becomes possible to prevent ceramics particles and the like in the plug paste from settling in the middle of the sealing process.

Next, the ceramic dried body filled with the plug paste is subjected to degreasing and firing processes under predetermined conditions.

Here, with respect to the degreasing and firing conditions and the like of the ceramic dried body, it is possible to apply conditions that have been conventionally used for manufacturing a filter made from porous ceramics.

Next, an alumina film having a high specific surface area is formed on the surface of the ceramic fired body obtained from the firing process, and a catalyst such as platinum is applied onto the surface of the alumina film so that an integral honeycomb structured body according to the first or second aspect of the present invention, which is made from a porous ceramic material on the surface of which a catalyst is supported, and formed by a single sintered body as a whole, is manufactured.

Here, upon manufacturing the integral honeycomb structured body according to the second aspect of the present invention, a method in which, after a catalyst has been applied to the entire honeycomb structured body, the portion of the partition wall that separates through holes constituting the group of large-capacity through holes and through holes constituting the group of small-capacity through holes from each other are subjected to a masking process and the resulting honeycomb structured body in this state is again subjected to a catalyst-applying process, or a method in which, after slurry containing a catalyst or materials of the catalyst has been applied to the entire honeycomb structured body, only the slurry adhered onto the portion of the partition wall that separates through holes constituting the group of large-capacity through holes and through holes constituting the group of small-capacity through holes from each other is removed by blowing a high-pressure gas thereto, may be used.

With respect to the method for forming the alumina film on the surface of the ceramic fired body, examples thereof may include: a method in which the ceramic fired body is impregnated with a solution of a metal compound containing aluminum such as $Al(NO_3)_3$ and then heated; a method in which the ceramic fired body is impregnated with a solution containing alumina powder, and then heated; and the like.

With respect to the method for applying a co-catalyst and the like to the alumina film, examples thereof may include a method in which the ceramic fired body is impregnated with a solution of a metal compound containing a rare-earth element, such as $Ce(NO_3)_3$, and then heated, and the like.

With respect to the method for applying a catalyst to the alumina film, examples thereof may include a method in which the ceramic fired body is impregnated with a solution of diamine dinitro platinum nitric acid ($[Pt(NH_3)_2(NO_2)_2]HNO_3$) and the like and then heated, and the like.

Moreover, in the case where the honeycomb structured body of the present invention is an aggregated honeycomb structured body 10 which is constituted by a plurality of integral honeycomb structured bodies 20 combined with one another through a sealing material layer 14 as shown in FIG. 7, a sealing material paste to form a sealing material layer 14 is applied onto the side face of the integral honeycomb structured body 20 with an even thickness, and other integral honeycomb structured bodies 20 are sequentially laminated thereon. A laminated body of a square-pillar shaped integral honeycomb structured bodies 20 having a predetermined size is thus manufactured.

Here, with respect to the material for forming the sealing material paste, the detailed description is omitted, since the explanation thereof has already been given.

Next, the laminated body of the integral honeycomb structured bodies 20 is heated so that the sealing material paste layer is dried and solidified to form the sealing material layer 14, and, by using a diamond cutter or the like, the peripheral portion thereof is then cut into a shape as shown in FIG. 7 so that a honeycomb block 15 is manufactured.

Then, a sealing material layer 13 is formed on the peripheral portion of the honeycomb block 15 by using the sealing material paste so that the aggregated-type filter 10 of the present invention, constituted by a plurality of integral honeycomb structured bodies 20 combined together through a sealing material layer 14, is manufactured.

Although not particularly limited, the honeycomb structured body of the present invention is desirably applied to an exhaust gas purifying (converting) device for use in vehicles.

Figure 8:
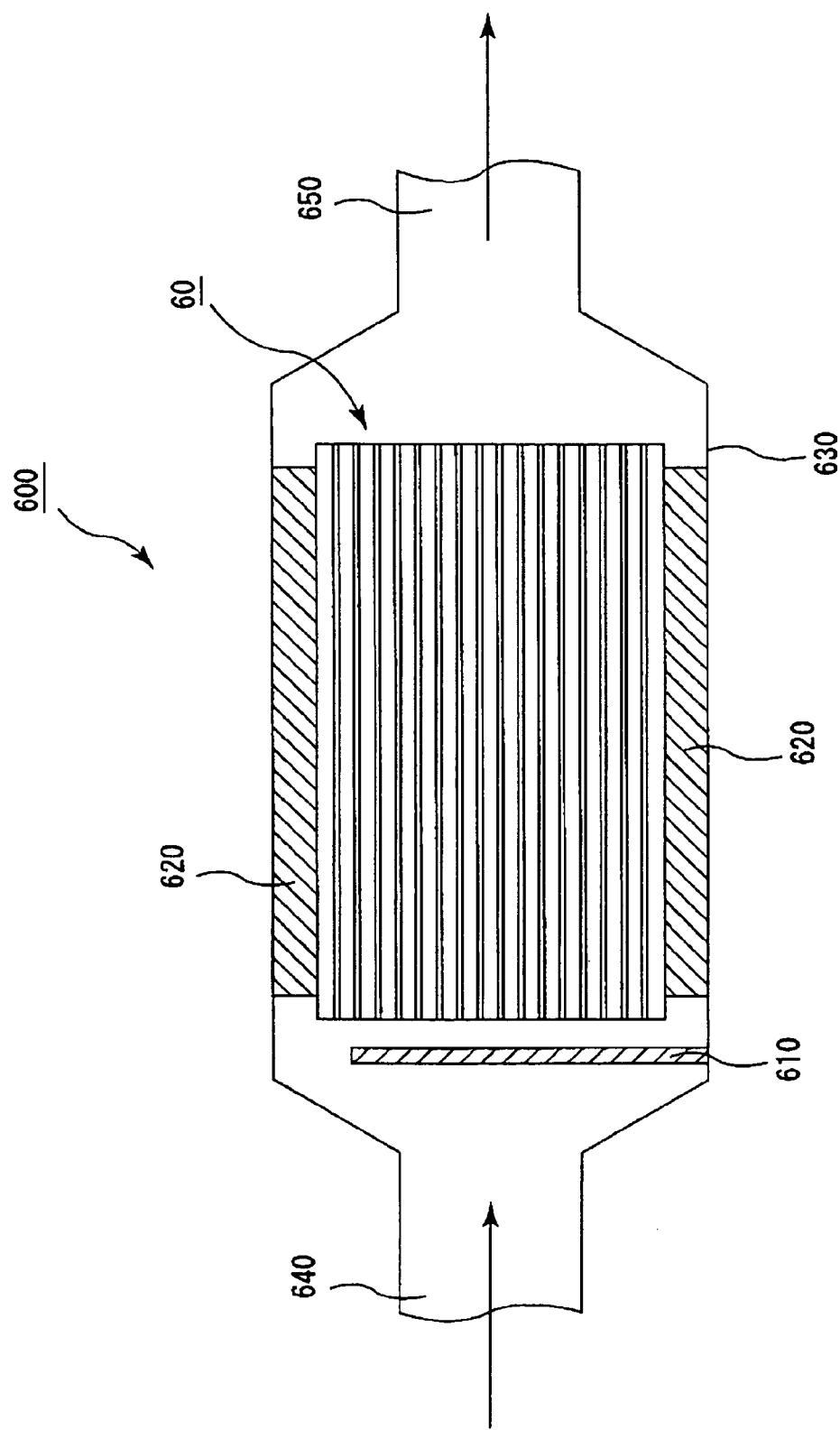
FIG. 8 is a cross-sectional view that schematically shows one example of an exhaust gas purifying (converting) device for a vehicle in which the honeycomb structured body of the present invention is placed.

FIG. 8 is a cross-sectional view that schematically shows one example of an exhaust gas purifying (converting) device of a vehicle in which the honeycomb structured body of the present invention is installed.

As shown in FIG. 8, an exhaust gas purifying (converting) device 600 is mainly constituted by a honeycomb structured body 60, a casing 630 that covers the external portion of the honeycomb structured body 60, a holding sealing material 620 that is placed between the honeycomb structured body 60 and the casing 630 and a heating means 610 placed at the exhaust gas inlet-side of the honeycomb structured body 60. An introducing pipe 640, which is connected to an internal combustion engine such as an engine, is connected to one end of the casing 630 on the exhaust gas inlet-side, and an exhaust pipe 650, which is connected to the outside, is connected to the other end of the casing 630. In FIG. 8, arrows show flows of exhaust gases.

Moreover, in FIG. 8, the honeycomb structured body 60 may be the integral honeycomb structured body 20 shown in FIG. 1A or the aggregated honeycomb structured body 10 shown in FIG. 7.

In the exhaust gas purifying (converting) device 600 having the above-mentioned constitution, exhaust gases, discharged from the internal combustion engine such as an engine, are directed into the casing 630 through the introducing pipe 640, and allowed to flow into the honeycomb structured body 60 through the large-capacity through holes 21a and to pass through the partition wall 23. Then, the exhaust gases are purified, with particulates thereof being collected in the partition wall 23, and are then discharged to the outside of the honeycomb structured body 60 from the small-capacity through holes 21b, and discharged outside through the exhaust pipe 650.

In the exhaust gas purifying (converting) device 600, after a large quantity of particulates accumulate on the partition wall of the honeycomb structured body 60 to cause an increase in pressure loss, the honeycomb structured body 60 is subjected to a regenerating process.

In the regenerating process, gases, heated by using a heating means 610, are allowed to flow into the through holes of the honeycomb structured body 60, so that the honeycomb structured body 60 is heated to burn and eliminate the particulates deposited on the partition wall. Moreover, the particulates may be burned and eliminated by using a post-injection system. In addition to these methods, a filter to which an oxide catalyst is applied may be placed at a portion of the introducing pipe 640 in front of the casing 630, or a filter to which an oxide catalyst is applied may be placed on the exhaust gas inlet-side of the heating means 610 inside the casing 630.

When the honeycomb structured body in accordance with the first, second or third aspect of the present invention is used for an exhaust gas purifying device for use in a vehicle, it becomes possible to prolong the period of time up to the regenerating process by suppressing an increase in the pressure loss upon collecting particulates, to improve a purifying performance of particulates, to improve the heat resistance, and also to freely adjust the size thereof.

EXAMPLES

Referring to the figures, the following description will discuss the present invention in detail by means of examples. However, the present invention is not intended to be limited by these examples.

Example 1

(1) Powder of α-type silicon carbide having an average particle size of 10 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to prepare a mixed composition. Next, after a slight amount of a plasticizer and a lubricant had been added to the mixed composition and further kneaded, the resulting mixture was extrusion-molded so that a raw molded product having a cross-sectional shape that was approximately the same shape as that shown in FIG. 3A, with an aperture rate on the inlet-side of 37.97% and a ratio of aperture rates of 1.52, was manufactured. The thickness of the portion 23b of the partition wall separating adjacently located large-capacity through holes 21a was set to 0.45 mm, and the thickness of the portion 23a of the partition wall separating a large-capacity through hole 21a and a small-capacity through hole 21b was set to 0.30 mm.

Next, after the above-mentioned raw molded product had been dried by using a microwave drier or the like to form a ceramic dried body, predetermined through holes were filled with a plug paste having the same composition as the raw molded product.

After having been dried once more by using a drier, the resulting product was degreased at 400° C., and fired at 2200° C. in a normal-pressure argon atmosphere for 3 hours to manufacture a ceramic fired body, which was made of a silicon carbide sintered body and had a porosity of 42%, an average pore diameter of 9 μm, a size of 34.3 mm×34.3 mm×150 mm and the number of through holes 21 of 28 pcs/cm$^2$ (large-capacity through holes 21a: 14 pcs/cm$^2$, small-capacity through holes 21b: 14 pcs/cm$^2$).

Here, in the integral honeycomb structured body 20, only the large-capacity through holes 21a were sealed by plugs on the end face on the outlet-side, and only the small-capacity through holes 21b were sealed with the plugs on the end face on the inlet-side.

(2) Al(NO$_3$)$_3$ was put into 1,3-butane diol, and stirred at 60° C. for 5 hours to prepare a 1,3-butane diol solution containing 30% by weight of Al(NO$_3$)$_3$. After the ceramic fired body had been immersed in this 1,3-butane diol solution, the resulting product was heated at 150° C. for 2 hours, and then heated at 400° C. for 2 hours, and after this had been further immersed in water at 80° C. for 2 hours, the resulting product was heated at 700° C. for 8 hours so that an alumina layer was formed on the surface of the ceramic fired body.

Ce(NO$_3$)$_3$ was put into ethylene glycol, and stirred at 90° C. for 5 hours to prepare an ethylene glycol solution containing 6% by weight of Ce(NO$_3$)$_3$. The ceramic fired body bearing the alumina layer formed thereon was immersed in this ethylene glycol solution, and heated at 150° C. for 2 hours, and then heated at 650° C. for 2 hours in a nitrogen atmosphere so that an alumina layer containing a rare-earth oxide to be used for supporting a catalyst on the surface of the ceramic fired body was formed.

Diammine dinitro platinum nitric acid ([Pt(NH$_3$)$_2$(NO$_2$)$_2$] HNO$_3$) having a platinum concentration of 4.53% by weight was diluted with distilled water, and the ceramic fired body on which the rare-earth oxide containing alumina layer was formed was immersed so that 2 g/L of Pt was deposited on the ceramic fired body, and this was heated at 110° C. for 2 hours, and then heated at 500° C. for 1 hour in a nitrogen atmosphere so that the platinum catalyst was supported on the surface of the ceramic fired body; thus, the manufacturing processes for the integral honeycomb structured body 20 were completed.

Examples 2 to 37, Comparative Examples 1 to 8

The same processes as Example 1 were carried out except that the cross-sectional shape perpendicular to the longitudinal direction and the thickness of the portion 23b of the partition wall which separates adjacently located large-capacity through holes 21a from each other were changed as shown in Table 1 to manufacture integral honeycomb structured bodies 20.

Here, both the cross-sectional shape perpendicular to the longitudinal direction and the thickness of the portion 23b of the partition wall which separates adjacently located large-capacity through holes 21b from each other, of the integral honeycomb structured body 20 were adjusted by changing the shape of a die for use in extrusion-molding the mixture composition.

Example 38

(1) 60% by weight of powder of α-type silicon carbide having an average particle diameter of 10 μm and 40% by weight of powder of β-type silicon carbide having an average particle diameter of 0.5 μm were wet-mixed, and to 100 parts by weight of the resulting mixture were added and kneaded 5 parts by weight of an organic binder (methyl cellulose) and 10 parts by weight of water to prepare a mixed composition. Next, after a slight amount of a plasticizer and a lubricant had been added to the mixed composition, and further kneaded, the resulting mixture was extrusion-molded so that a raw molded product having a cross-sectional shape that is approximately the same shape as that shown in FIG. 3A, with an aperture rate on the inlet-side of 37.97% and a ratio of aperture rates of 1.52, was manufactured. Both the thickness of the portion 23b of the partition wall which separates adjacently located large-capacity through holes 21a from each other and the thickness of the portion 23a of the partition wall separating a large-capacity through hole 21a and a small-capacity through hole 21b were set to 0.30 mm.

Next, after the above-mentioned raw molded product had been dried by using a microwave drier or the like to form a ceramic dried body, predetermined through holes were filled with a plug paste having the same composition as the raw molded product.

After having been dried once more by using a drier, the resulting product was degreased at 400° C., and sintered at 2200° C. in a normal-pressure argon atmosphere for 3 hours to manufacture a ceramic fired body, which was made of a silicon carbide sintered body and had a porosity of 42%, an average pore diameter of 9 µm, a size of 34.3 mm×34.3 mm×150 mm and the number of through holes 21 of 28 pcs/cm$^2$ (large-capacity through holes 21a: 14 pcs/cm$^2$, small-capacity through holes 21b: 14 pcs/cm$^2$).

Here, in the integral honeycomb structured body 20, only the large-capacity through holes 21a were sealed by plugs on the end face on the outlet-side, and only the small-capacity through holes 21b were sealed with the plugs on the end face on the inlet-side.

(2) Al(NO$_3$)$_3$ was put into 1,3-butane diol, and stirred at 60° C. for 5 hours to prepare a 1,3-butane diol solution containing 30% by weight of Al(NO$_3$)$_3$. After the ceramic fired body had been immersed in this 1,3-butane diol solution, the resulting product was heated at 150° C. for 2 hours, and then heated at 400° C. for 2 hours, and after this had been further immersed in water at 80° C. for 2 hours, the resulting product was heated at 700° C. for 8 hours so that an alumina layer was formed on the surface of the ceramic fired body.

Ce(NO$_3$)$_3$ was put into ethylene glycol, and stirred at 90° C. for 5 hours to prepare an ethylene glycol solution containing 6% by weight of Ce(NO$_3$)$_3$. The ceramic fired body bearing the alumina layer formed thereon was immersed in this ethylene glycol solution, and heated at 150° C. for 2 hours, and then heated at 650° C. for 2 hours in a nitrogen atmosphere so that an alumina layer containing a rare-earth oxide to be used for supporting a catalyst on the surface of the ceramic fired body was formed.

The ceramic fired body bearing the alumina layer containing a rare-earth oxide formed thereon was immersed in an aqueous solution of diammine dinitro platinum nitric acid, and heated at 110° C. for 2 hours, and then heated at 500° C. for 1 hour in a nitrogen atmosphere so that 2 g/L of platinum catalyst was supported on the entire surface of the ceramic fired body.

Next, phenol resin was poured onto the surface of the portion 23a of the partition wall that separates a large-capacity through hole 21a and a small-capacity through hole 21b, and heated and cured so that a masking process was carried out. After the ceramic fired body subjected to the masking process had been immersed once more in an aqueous solution of diammine dinitro platinum nitric acid, the resulting product was heated at 110° C. for 2 hours, and then heated at 500° C. for 1 hour in a nitrogen atmosphere so that 1 g/L of platinum catalyst was further supported on the portion 23b of the partition wall separating adjacently located large-capacity through holes 21a from each other. Next, this was heated at 500° C. for 5 hours so that the phenol resin was burned and removed; thus, the manufacturing processes for the integral honeycomb structured body 20 were completed.

Here, the amount of supported catalyst can also be adjusted by reducing the amount of solution on the partition wall by blowing air onto the structural body that had been immersed in the above-mentioned various catalyst applying solutions.

In the resulting integral honeycomb structured body 20, the platinum catalyst was supported on the portion 23a of the partition wall separating a large-capacity through hole 21a and a small-capacity through hole 21b at a rate of 2 g/L, and was also supported on the portion 23b of the partition wall separating adjacently located large-capacity through holes 21a from each other at a rate of 2.6 g/L. Here, the amounts of supported catalyst on the portions 23a, 23b of partition wall were calculated based upon the amounts of catalyst (weights) on the respective portions 23a, 23b of partition wall and the rates at which the respective portions of partition walls accounted for the honeycomb structured body.

Examples 39 to 81, Comparative Examples 9 to 16

The same processes as Example 38 were carried out except that the cross-sectional shape perpendicular to the longitudinal direction of the integral honeycomb structured body 20 and the amount of platinum catalyst supported on the portion 23b of the partition wall separating adjacently located large-capacity through holes 21a from each other were changed as shown in Table 2 to manufacture integral honeycomb structured bodies 20.

Here, the cross-sectional shape perpendicular to the longitudinal direction of the integral honeycomb structured body 20 was adjusted by changing the shape of a die upon extrusion-molding the mixture composition. Moreover, the amount of platinum catalyst supported on the portion 23b of the partition wall separating adjacently located large-capacity through holes 21a of the integral honeycomb structured body 20 from each other was adjusted by changing the concentration of the aqueous solution of diammine dinitro platinum nitric acid in which the ceramic fired body subjected to the masking process was immersed.

(Filter Regenerating Test)

As shown in FIG. 8, each of the integral honeycomb structured bodies of the examples and comparative examples was placed in an exhaust passage of an engine to form an exhaust gas purifying device, and the engine was driven so that the integral honeycomb structured body was allowed to collect particulates of 7 g/L.

Next, the integral honeycomb structured body that had collected particulates was placed in a reaction testing device so that the integral honeycomb structured body was maintained at 200° C., with nitrogen gas being introduced into the integral honeycomb structured body at a flow rate of 130 L/min.

Next, a simulation gas, which had approximately the same composition as exhaust gases of a diesel engine except that no particulates were contained therein, was introduced into the integral honeycomb structured body under conditions of a temperature of 650° C., a pressure of 8 kPa and a flow time of 7 minutes so that particulates were burned. In this case, a honeycomb structured catalyst-supporting body (size: 34.3 mm×34.3 mm×70 mm, cell concentration: 400 cells/inch, amount of platinum supported: 5 g/L), made from commercial cordierite, was placed on the simulation gas inlet-side from the integral honeycomb structured body, and the simulation gas that had passed through the honeycomb structured catalyst-supporting body was introduced into the integral honeycomb structured body.

Lastly, the weight of the integral honeycomb structured body was measured to find out a rate (filter regenerating rate) of burned particulates to the collected particulates of 7 g/L so that the purifying performance of particulates was evaluated.

Additionally, with respect to integral honeycomb structured bodies according to Examples 38 to 81 and Comparative Examples 9 to 16, these were heated at 850° C. for 20 hours in the atmosphere in pretreatment prior to installation in an exhaust passage in an engine.

Here, the simulation gas had contained $C_3H_6$ (6540 ppm), CO (5000 ppm), NOx (160), SOx (8 ppm), $CO_2$ (0.038%), $H_2O$ (10%) and $O_2$ (10%). Moreover, the introduction of the simulation gas increased the temperature of the integral honeycomb structured body to about 600° C.

Here, with respect to the measuring device, a MEXA-7500D (MOTOR EXHAUST GAS ANALYZER, manufactured by Horiba Ltd.) was used. In this device, CO, $CO_2$ and $SO_2$ were detected by NDIR (Non-Dispersive InfraRed-absorbing system), $O_2$ was detected by MPOP (Magnetic Pressure System), HC was detected by FID (Flame Ionization Detector), and NOx was detected by CLD.

Figure 9:
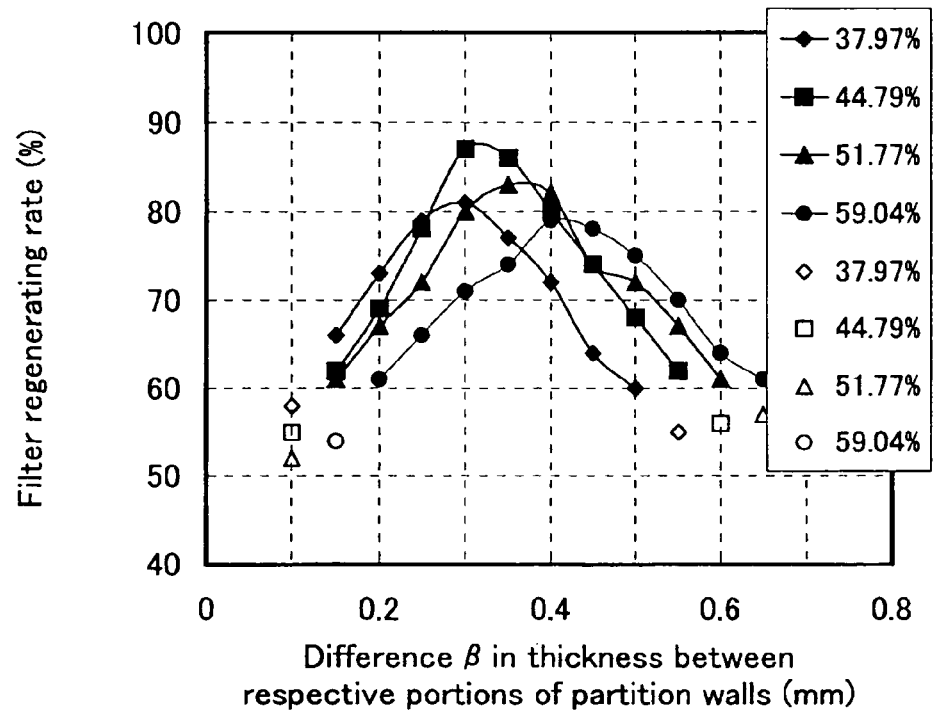
FIG. 9 is a graph in which, with respect to each of integral honeycomb structured bodies according to Examples 1 to 37 and Comparative Examples 1 to 8, a relationship between: a filter regenerating rate in each of filter regenerating tests; and a difference β in thickness between the respective portions of partition walls, is indicated for each of aperture rates on the inlet-side.
Figure 10:
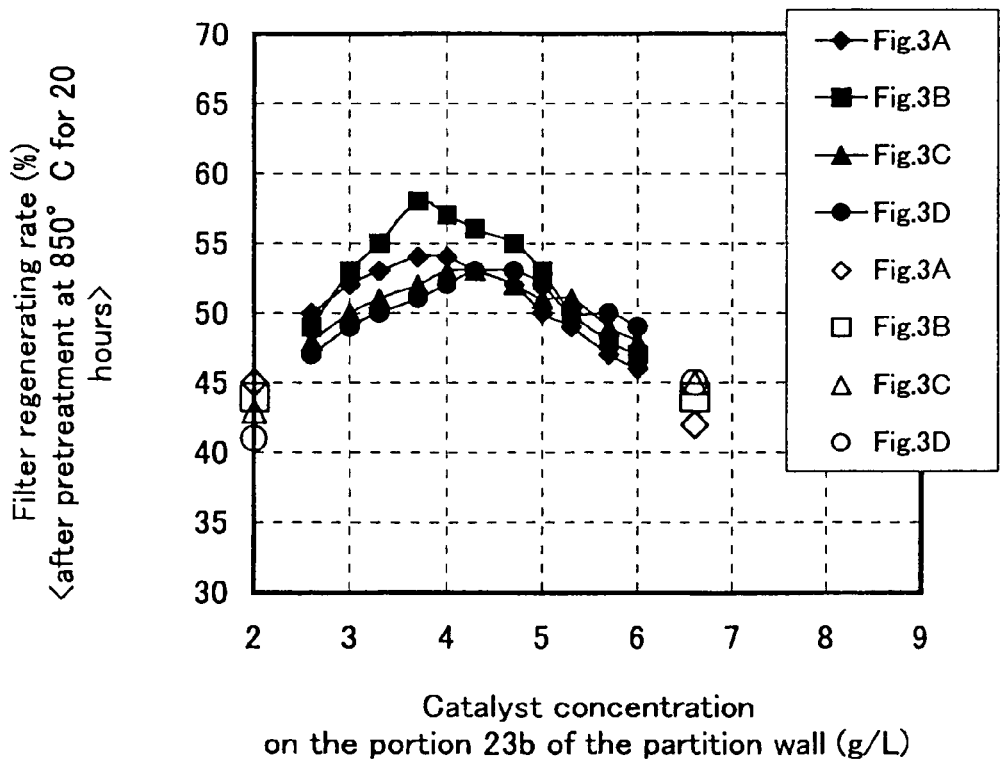
FIG. 10 is a graph in which, with respect to each of the integral honeycomb structured bodies according to Examples 38 to 81 and Comparative Examples 9 to 16, a relationship between: a filter regenerating rate in each of the filter regenerating tests; and a platinum catalyst concentration on the portion 23b of the partition wall that separates adjacently located large-capacity through holes 21a from each other, is indicated for each of cross-sectional shapes of the integral honeycomb structured bodies.
Figure 11:
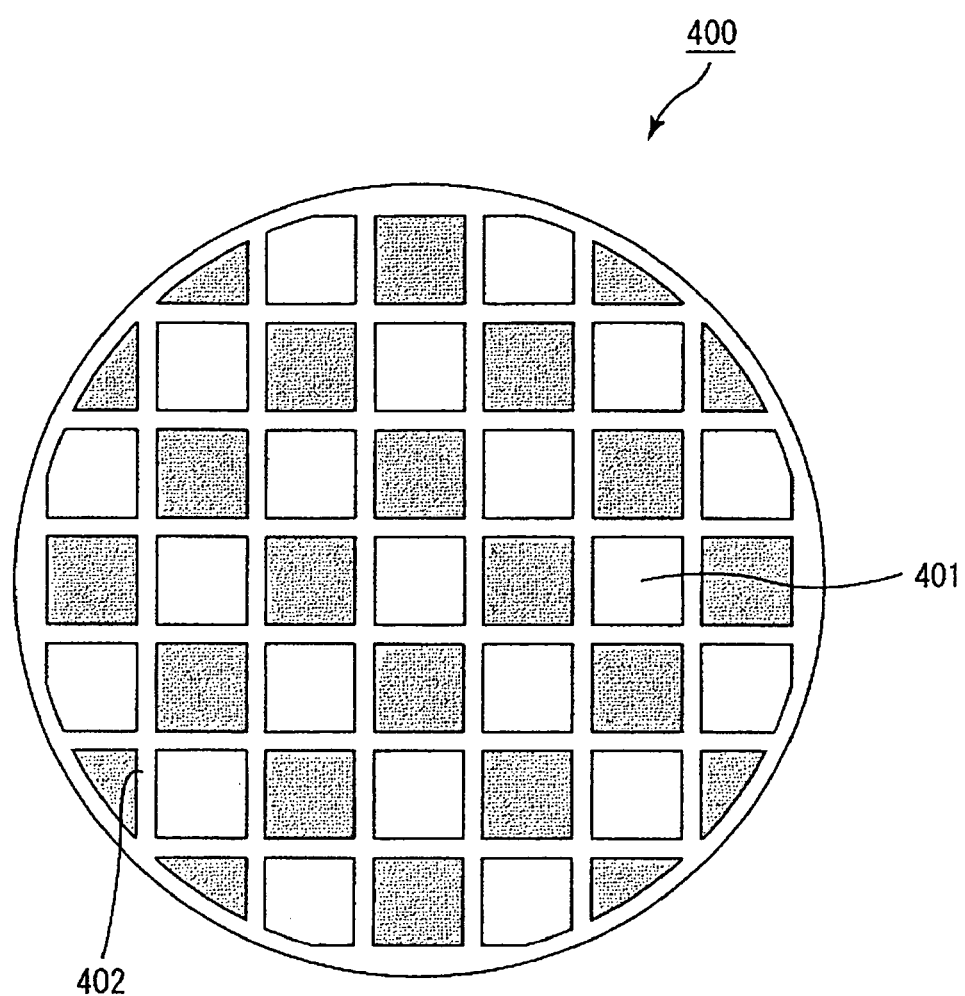
FIG. 11 is a cross-sectional view that schematically shows one example of a conventional honeycomb structured body.

Tables 1 and 2 as well as FIGS. 9 and 10 show the results of the filter regenerating tests.

FIG. 9 is a graph in which, with respect to each of the integral honeycomb structured bodies according to Examples 1 to 37 and Comparative Examples 1 to 8, a relationship between a filter regenerating rate in each of the filter regenerating tests and a difference β in thickness between the respective portions of partition walls is indicated for each of aperture rates on the inlet-side, and the solid dots represent the examples, while hollow dots represent the comparative examples.

Moreover, FIG. 10 is a graph in which, with respect to each of the integral honeycomb structured bodies according to Examples 38 to 81 and Comparative Examples 9 to 16, a relationship between a filter regenerating rate in each of the filter regenerating tests and a platinum catalyst concentration on the portion 23b of the partition wall that separates adjacently located large-capacity through holes 21a from each other is indicated for each of cross-sectional shapes of the integral honeycomb structured bodies, and the solid dots represent the examples, while hollow dots represent the comparative examples.

TABLE 1

| | Cross-sectional shape of honeycomb structured body | Inlet-side aperture rate α (%) | Ratio of aperture rates | Thickness of the portion 23a of the partition wall (mm) | Difference β in thickness between respective portions of partition walls (mm) | 0.0022α + 0.0329 | 0.0046α + 0.0077 | 0.0071α + 0.1553 | 0.0071α + 0.2553 | Filter regenerating rate (%) |
|---|---|---|---|---|---|---|---|---|---|---|
| Example 1 | FIG. 3A | 37.97 | 1.55 | 0.3 | 0.15 | 0.12 | 0.18 | 0.42 | 0.52 | 66 |
| Example 2 | | | | | 0.20 | | | | | 73 |
| Example 3 | | | | | 0.25 | | | | | 79 |
| Example 4 | | | | | 0.30 | | | | | 81 |
| Example 5 | | | | | 0.35 | | | | | 77 |
| Example 6 | | | | | 0.40 | | | | | 72 |
| Example 7 | | | | | 0.45 | | | | | 64 |
| Example 8 | | | | | 0.50 | | | | | 60 |
| Example 9 | FIG. 3B | 44.79 | 2.54 | 0.3 | 0.15 | 0.13 | 0.21 | 0.47 | 0.57 | 62 |
| Example 10 | | | | | 0.20 | | | | | 69 |
| Example 11 | | | | | 0.25 | | | | | 78 |
| Example 12 | | | | | 0.30 | | | | | 87 |
| Example 13 | | | | | 0.35 | | | | | 86 |
| Example 14 | | | | | 0.40 | | | | | 80 |
| Example 15 | | | | | 0.45 | | | | | 74 |
| Example 16 | | | | | 0.50 | | | | | 68 |
| Example 17 | | | | | 0.55 | | | | | 62 |
| Example 18 | FIG. 3C | 51.77 | 4.45 | 0.3 | 0.15 | 0.15 | 0.25 | 0.52 | 0.62 | 61 |
| Example 19 | | | | | 0.20 | | | | | 67 |
| Example 20 | | | | | 0.25 | | | | | 72 |
| Example 21 | | | | | 0.30 | | | | | 80 |
| Example 22 | | | | | 0.35 | | | | | 83 |
| Example 23 | | | | | 0.40 | | | | | 82 |
| Example 24 | | | | | 0.45 | | | | | 74 |
| Example 25 | | | | | 0.50 | | | | | 72 |
| Example 26 | | | | | 0.55 | | | | | 67 |
| Example 27 | | | | | 0.60 | | | | | 61 |
| Example 28 | FIG. 3D | 59.04 | 6.00 | 0.3 | 0.20 | 0.16 | 0.28 | 0.57 | 0.67 | 61 |
| Example 29 | | | | | 0.25 | | | | | 66 |
| Example 30 | | | | | 0.30 | | | | | 71 |
| Example 31 | | | | | 0.35 | | | | | 74 |
| Example 32 | | | | | 0.40 | | | | | 79 |
| Example 33 | | | | | 0.45 | | | | | 78 |
| Example 34 | | | | | 0.50 | | | | | 75 |
| Example 35 | | | | | 0.55 | | | | | 70 |
| Example 36 | | | | | 0.60 | | | | | 64 |
| Example 37 | | | | | 0.65 | | | | | 61 |
| Comparative Example 1 | FIG. 3A | 37.97 | 1.55 | 0.3 | 0.10 | 0.12 | 0.18 | 0.42 | 0.52 | 58 |
| Comparative Example 2 | | | | | 0.55 | | | | | 55 |
| Comparative Example 3 | FIG. 3B | 44.79 | 2.54 | 0.3 | 0.10 | 0.13 | 0.21 | 0.47 | 0.57 | 55 |
| Comparative Example 4 | | | | | 0.60 | | | | | 56 |
| Comparative Example 5 | FIG. 3C | 51.77 | 4.45 | 0.3 | 0.10 | 0.15 | 0.25 | 0.52 | 0.62 | 52 |
| Comparative | | | | | 0.65 | | | | | 57 |

TABLE 1-continued

| | Cross-sectional shape of honeycomb structured body | Inlet-side aperture rate α (%) | Ratio of aperture rates | Thickness of the portion 23a of the partition wall (mm) | Difference β in thickness between respective portions of partition walls (mm) | $0.0022\alpha + 0.0329$ | $0.0046\alpha + 0.0077$ | $0.0071\alpha + 0.1553$ | $0.0071\alpha + 0.2553$ | Filter regenerating rate (%) |
|---|---|---|---|---|---|---|---|---|---|---|
| Example 6 | | | | | | | | | | |
| Comparative Example 7 | FIG. 3D | 59.04 | 6.00 | 0.3 | 0.15 | 0.16 | 0.28 | 0.57 | 0.67 | 54 |
| Comparative Example 8 | | | | | 0.70 | | | | | 57 |

TABLE 2

| | Cross-sectional shape of honeycomb structured body | Inlet-side aperture rate α (%) | Ratio of aperture rates | Catalyst concentration of the portion 23a of the partition wall (g/L) | Catalyst concentration of the portion 23b of the partition wall (g/L) | Filter regenerating rate (%) <after pretreatment at 850° C. for 20 hours> |
|---|---|---|---|---|---|---|
| Example 38 | FIG. 3A | 37.97 | 1.55 | 2.0 | 2.6 | 50 |
| Example 39 | | | | | 3.0 | 52 |
| Example 40 | | | | | 3.3 | 53 |
| Example 41 | | | | | 3.7 | 54 |
| Example 42 | | | | | 4.0 | 54 |
| Example 43 | | | | | 4.3 | 53 |
| Example 44 | | | | | 4.7 | 52 |
| Example 45 | | | | | 5.0 | 50 |
| Example 46 | | | | | 5.3 | 49 |
| Example 47 | | | | | 5.7 | 47 |
| Example 48 | | | | | 6.0 | 46 |
| Example 49 | FIG. 3B | 44.79 | 2.54 | 2.0 | 2.6 | 49 |
| Example 50 | | | | | 3.0 | 53 |
| Example 51 | | | | | 3.3 | 55 |
| Example 52 | | | | | 3.7 | 58 |
| Example 53 | | | | | 4.0 | 57 |
| Example 54 | | | | | 4.3 | 56 |
| Example 55 | | | | | 4.7 | 55 |
| Example 56 | | | | | 5.0 | 53 |
| Example 57 | | | | | 5.3 | 50 |
| Example 58 | | | | | 5.7 | 48 |
| Example 59 | | | | | 6.0 | 47 |
| Example 60 | FIG. 3C | 51.77 | 4.45 | 2.0 | 2.6 | 48 |
| Example 61 | | | | | 3.0 | 50 |
| Example 62 | | | | | 3.3 | 51 |
| Example 63 | | | | | 3.7 | 52 |
| Example 64 | | | | | 4.0 | 53 |
| Example 65 | | | | | 4.3 | 53 |
| Example 66 | | | | | 4.7 | 52 |
| Example 67 | | | | | 5.0 | 51 |
| Example 68 | | | | | 5.3 | 51 |
| Example 69 | | | | | 5.7 | 49 |
| Example 70 | | | | | 6.0 | 48 |
| Example 71 | FIG. 3D | 59.04 | 6.00 | 2.0 | 2.6 | 47 |
| Example 72 | | | | | 3.0 | 49 |
| Example 73 | | | | | 3.3 | 50 |
| Example 74 | | | | | 3.7 | 51 |
| Example 75 | | | | | 4.0 | 52 |
| Example 76 | | | | | 4.3 | 53 |
| Example 77 | | | | | 4.7 | 53 |
| Example 78 | | | | | 5.0 | 52 |
| Example 79 | | | | | 5.3 | 50 |
| Example 80 | | | | | 5.7 | 50 |
| Example 81 | | | | | 6.0 | 49 |
| Comparative Example 9 | FIG. 3A | 37.97 | 1.55 | 2.0 | 2.0 | 45 |
| Comparative Example 10 | | | | | 6.6 | 42 |
| Comparative Example 11 | FIG. 3B | 44.79 | 2.54 | 2.0 | 2.0 | 44 |
| Comparative Example 12 | | | | | 6.6 | 44 |
| Comparative | FIG. 3C | 51.77 | 4.45 | 2.0 | 2.0 | 43 |

TABLE 2-continued

| | Cross-sectional shape of honeycomb structured body | Inlet-side aperture rate α (%) | Ratio of aperture rates | Catalyst concentration of the portion 23a of the partition wall (g/L) | Catalyst concentration of the portion 23b of the partition wall (g/L) | Filter regenerating rate (%) <after pretreatment at 850° C. for 20 hours> |
|---|---|---|---|---|---|---|
| Example 13 | | | | | | |
| Comparative Example 14 | | | | | 6.6 | 45 |
| Comparative Example 15 | FIG. 3D | 59.04 | 6.00 | 2.0 | 2.0 | 41 |
| Comparative Example 16 | | | | | 6.6 | 45 |

As shown in Table 1 and FIG. 9, in each of integral honeycomb structured bodies according to the respective examples which satisfy the above-mentioned inequalities (1) and (2), the filter regenerating rate was 60% or more.

As shown in Table 2 and FIG. 10, in each of integral honeycomb structured bodies according to the respective examples in which the partition wall catalyst concentration ratio is set in the range of 1.1 to 3.0, the filter regenerating rate after a heating treatment at 850° C. was not less than 46%.

What is claimed as new and desired to be secured by Letters Patent of the United States is:

1. A pillar-shaped honeycomb structured body, comprising:
   a plurality of large-capacity through holes and a plurality of small-capacity through holes;
   a first partition wall between two adjacent large-capacity through holes;
   a second partition wall between a large-capacity through holes and a small-capacity through holes adjacent to each other,
   a first end face and a second end face, wherein each of the plurality of large-capacity through holes and small-capacity through holes extends from the first end face to the second end face,
   wherein a large-capacity through hole is sealed at the first end face and a small-capacity through hole is sealed at the second end face,
   wherein an aperture rate α (%) is a ratio between the sum of the area of the large-capacity through holes at the second end face and the area of the second end face,
   wherein the difference in the thickness of the first partition wall and the second partition wall is β (mm),
   wherein α and β satisfy the following inequalities (1) and (2):

$$0.0022\alpha + 0.0329 \leq \beta \leq 0.0071\alpha + 0.2553 \quad (1),$$

and $$\text{about } 35 \leq \alpha \leq \text{about } 60 \quad (2).$$

2. The honeycomb structured body according to claim 1, wherein α and β satisfy the following inequality (3):

$$0.0046\alpha + 0.0077 \leq \beta \leq 0.0071\alpha + 0.1553 \quad (3).$$

3. The honeycomb structured body according to claim 1, wherein the first partition wall has a thickness of about 0.2 to about 1.2 mm.

4. The honeycomb structured body according to claim 1, wherein the second partition wall has a thickness of about 0.2 to about 1.2 mm.

5. The honeycomb structured body according to claim 1, wherein said aperture rate α at the second end face is about 35% to about 60%.

6. The honeycomb structured body according to claim 5, wherein said aperture rate α at the second end face is about 40% to about 55%.

7. The honeycomb structured body according to claim 1, wherein a catalyst is supported on the first partition wall.

8. The honeycomb structured body according to claim 7, wherein said catalyst comprises at least one element chosen from noble metal, alkali metal, alkali earth metal, rare-earth element, and transition metal element.

9. The honeycomb structured body according to claim 8, wherein said noble metal comprises at least one element selected from the group consisting of platinum, palladium, and rhodium.

10. The honeycomb structured body according to claim 7, wherein said catalyst is supported on a surface of the first partition wall and on a surface of a pore inside the first partition wall.

11. The honeycomb structured body according to claim 7, wherein a catalyst is further supported on the second partition wall, wherein the ratio of the catalyst loading on the first partition wall and the catalyst loading on the second partition wall is in the range of about 1.1 to about 3.0.

12. The honeycomb structured body according to claim 1, wherein the material of construction comprises a porous ceramic material.

13. The honeycomb structured body according to claim 12, wherein the ceramic material is chosen from nitride ceramics, carbide ceramics, and oxide ceramics.

14. The honeycomb structured body according to claim 12, wherein the porosity of said honeycomb structured body is in the range of about 20% to about 80%.

15. The honeycomb structured body according to claim 12, wherein the average pore diameter of said honeycomb structured body is in the range of about 1 μm to about 100 μm.

16. The honeycomb structured body according to claim 1, wherein the contour of the large-capacity through holes and/or or the small-capacity through holes on a cross section perpendicular to the longitudinal direction of the honeycomb structured body is polygonal.

17. The honeycomb structured body according to claim 1, wherein the contour of the large-capacity through holes on a cross section perpendicular to the longitudinal direction of the honeycomb structured body is octagonal, and the contour of the small-capacity through holes on a cross section perpendicular to the longitudinal direction of the honeycomb structured body is quadrangular.

18. The honeycomb structured body according to claim 1, wherein a ratio of the areas of the large-capacity through holes and the areas of small-capacity through holes on a cross section perpendicular to the longitudinal direction of the honeycomb structure body is in the range of about 1.5 to about 2.7.

19. The honeycomb structured body according to claim 1, wherein the first partition wall and the second partition wall form an obtuse angle on a cross section perpendicular to the longitudinal direction of the honeycomb structured body.

20. The honeycomb structured body according to claim 1, wherein the contour of the large-capacity through holes or the small-capacity through holes is curvilinear on a cross section perpendicular to the longitudinal direction of the honeycomb structured body.

21. The honeycomb structured body according to claim 1, wherein a distance between centers of gravity of two adjacent large-capacity through holes on a cross section perpendicular to the longitudinal direction of the honeycomb structured body equals a distance between centers of gravity of two adjacent small-capacity through holes on a cross section perpendicular to the longitudinal direction of the honeycomb structured body.

22. The honeycomb structured body according to claim 1, wherein the number of large-capacity through holes and the number of small-capacity through holes are substantially the same.

23. A pillar-shaped honeycomb structured body, comprising:
   a plurality of large-capacity through holes and a plurality of small-capacity through holes;
   a first partition wall between two adjacent large-capacity through holes;
   a second partition wall between a large-capacity through hole and a small-capacity though hole adjacent to each other;
   a catalyst supported on the first partition wall and the second partition wall,
   wherein the ratio between the catalyst loading on the first partition wall and the catalyst loading on the second partition wall is in a range of about 1.1 to about 3.0.

24. The honeycomb structured body according to claim 23, wherein the catalyst comprises platinum, and a ratio between the platinum loading on the first partition wall and the platinum loading on the second partition wall is in the range of about 1.1 to about 3.0.

25. The honeycomb structured body according to any one of claims 1 to 24, wherein the honeycomb structured body is in an exhaust gas purifying device in a vehicle.

26. A honeycomb structured body, comprising:
   a honeycomb block formed by combining a plurality of the honeycomb structured bodies according to any one of claims 1 to 24 together through an adhesive layer; and
   a sealing material layer which is formed on the peripheral face of said honeycomb block.

27. The honeycomb structured body according to claim 26, wherein said adhesive layer comprises a dense material or a porous material.

28. The honeycomb structured body according to claim 27, wherein the honeycomb structured body is in an exhaust gas purifying device in a vehicle.

29. The honeycomb structured body according to claim 26, wherein said adhesive layer and said sealing material layer comprise at least one component chosen from inorganic fibers, inorganic particles, an inorganic binder, and an organic binder.

30. The honeycomb structured body according to claim 26, wherein the honeycomb structured body is in an exhaust gas purifying device in a vehicle.

* * * * *

UNITED STATES PATENT AND TRADEMARK OFFICE
CERTIFICATE OF CORRECTION

PATENT NO. : 7,785,695 B2  Page 1 of 1
APPLICATION NO. : 11/341507
DATED : August 31, 2010
INVENTOR(S) : Kazushige Ohno et al.

It is certified that error appears in the above-identified patent and that said Letters Patent is hereby corrected as shown below:

Add the following to the title page, items
-- (63)     Related U.S. Application Data
Continuation of application No. PCT/JP04/15505, filed October 20, 2004.
(30)     Foreign Application Priority Data
October 20, 2003 (JP)...................................................... 2003-359235
October 22, 2003 (JP).................................................. 2003-362512 --.

In claim 16, col. 38, lines 55-56, "and/or or" should read -- or --.
In claim 26, col. 40, line 18, "layer which is formed on" should read -- layer on --.

Signed and Sealed this

Sixteenth Day of November, 2010

David J. Kappos
*Director of the United States Patent and Trademark Office*